US010419726B2

(12) United States Patent
Jeong

(10) Patent No.: US 10,419,726 B2
(45) Date of Patent: Sep. 17, 2019

(54) STREAMING VIDEO FROM AUDIO/VIDEO RECORDING AND COMMUNICATION DEVICES

(71) Applicant: Ring Inc., Santa Monica, CA (US)

(72) Inventor: Changsoo Jeong, Rancho Palos Verdes, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/861,306

(22) Filed: Jan. 3, 2018

(65) Prior Publication Data
US 2018/0192009 A1 Jul. 5, 2018

Related U.S. Application Data

(60) Provisional application No. 62/441,915, filed on Jan. 3, 2017.

(51) Int. Cl.
*H04N 7/18* (2006.01)
*G08B 13/191* (2006.01)
(Continued)

(52) U.S. Cl.
CPC ........... *H04N 7/186* (2013.01); *G08B 13/191* (2013.01); *G08B 13/1961* (2013.01);
(Continued)

(58) Field of Classification Search
CPC ........ H04N 7/188; H04N 7/183; H04N 7/142; H04N 5/232; H04N 7/147;
(Continued)

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

CN 2585521 Y 11/2003
CN 2792061 Y 6/2006
(Continued)

OTHER PUBLICATIONS

Ahn, Jeong Hwan, International Search Report and Written Opinion of the International Searching Authority for PCT/US/2018/012213, dated Apr. 26, 2018, International Application Division, Korean Intellectual Property Office, Republic of Korea.

*Primary Examiner* — Hung Q Dang
(74) *Attorney, Agent, or Firm* — Chong IP Law, LLP

(57) ABSTRACT

Streaming video from audio/video (A/V) recording and communication devices in accordance with various embodiments of the present disclosure are provided. In one embodiment, an audio/video (A/V) recording and communication device is provided, comprising: a camera configured to capture image data of an object within a field of view; a communication module; and a processing module comprising: a processor; and a motion detection application which configures the processor to: detect motion of the object; capture image data of the object; track the object within the field of view; stream the image data to a client device using the communication module; determine when the object is no longer detected within the field of view; start a timer upon determining that the object is no longer detected within the field of view; and stop capturing the image data, tracking the object, and streaming the image data upon expiration of the timer.

17 Claims, 31 Drawing Sheets

(51) Int. Cl.
*G08B 13/196* (2006.01)
*H04N 5/33* (2006.01)
*H04N 5/232* (2006.01)
*H04N 5/225* (2006.01)
*H04N 5/235* (2006.01)

(52) U.S. Cl.
CPC . *G08B 13/19656* (2013.01); *G08B 13/19658* (2013.01); *G08B 13/19669* (2013.01); *G08B 13/19684* (2013.01); *G08B 13/19695* (2013.01); *H04N 5/2252* (2013.01); *H04N 5/2256* (2013.01); *H04N 5/2354* (2013.01); *H04N 5/23222* (2013.01); *H04N 5/23241* (2013.01); *H04N 5/332* (2013.01)

(58) Field of Classification Search
CPC .... H04N 2007/145; H04N 7/18; H04N 7/181; H04N 5/33; H04N 5/23216; H04N 5/23238; G06F 3/0304; G06F 3/0425; G06F 3/017; G06K 9/00771; G06K 9/2081; G06K 9/00335; G06T 7/20; G06T 2207/30232; G06T 19/006; G01S 3/7864; G08B 13/19602; G08B 13/16908; A63F 2300/1093; E21B 47/0002
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,906,722 B1* | 2/2018 | Gigot ............... H04N 5/23241 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2004/0212677 A1 | 10/2004 | Uebbing |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0291104 A1* | 12/2007 | Petersen ............... G01S 3/7865 348/14.01 |
| 2009/0207247 A1 | 8/2009 | Zampieron et al. |
| 2010/0225455 A1 | 9/2010 | Claiborne et al. |
| 2011/0279475 A1* | 11/2011 | Ikenoue ............... G06K 9/6204 345/619 |
| 2013/0057695 A1 | 3/2013 | Huisking |
| 2013/0286202 A1 | 10/2013 | Wu |
| 2014/0098286 A1 | 4/2014 | Kannermark et al. |
| 2014/0267716 A1 | 9/2014 | Child et al. |
| 2014/0292507 A1* | 10/2014 | Null ............... G08B 29/183 340/523 |
| 2015/0063711 A1* | 3/2015 | Briggs ............... G06K 9/00979 382/203 |
| 2015/0163463 A1 | 6/2015 | Hwang et al. |
| 2016/0027269 A1 | 1/2016 | Trundle et al. |
| 2017/0244959 A1* | 8/2017 | Ranjeet ............ G08B 13/19641 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |

(56) References Cited

FOREIGN PATENT DOCUMENTS

| | | |
|---|---|---|
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

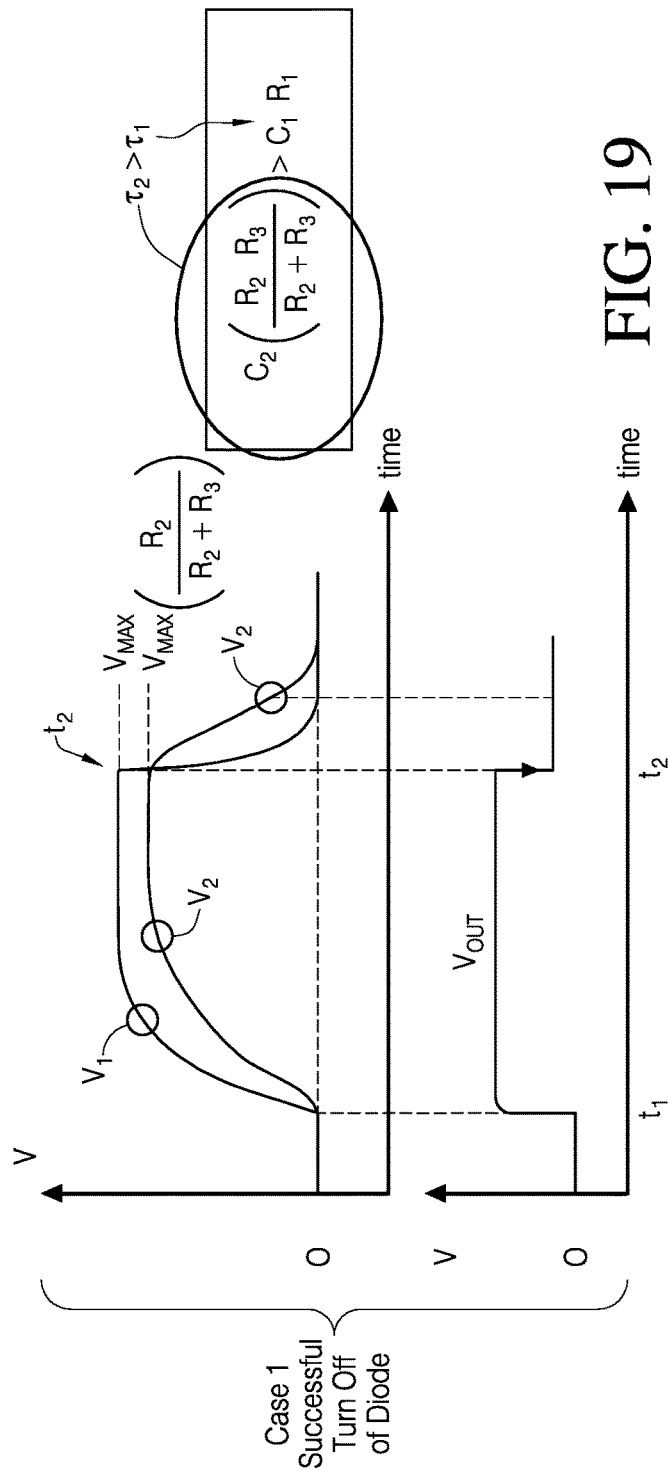

STREAMING VIDEO FROM AUDIO/VIDEO RECORDING AND COMMUNICATION DEVICES

CROSS-REFERENCE TO RELATED APPLICATION

This application claims priority to provisional application Ser. No. 62/441,915, filed on Jan. 3, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the configuration and functionality of A/V recording and communication devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication doorbell systems provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of an A/V recording and communication doorbell at the entrance to a home acts as a powerful deterrent against would-be burglars.

SUMMARY

The various embodiments of the present audio/video (A/V) recording and communication doorbells have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that in current audio/video (A/V) recording and communication doorbell systems other than the present embodiments, it is difficult if not impossible to connect the A/V recording and communication doorbell to the existing household AC power supply (may also be referred to as AC mains), because the A/V recording and communication doorbell draws an amount of power from the AC power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. The present A/V recording and communication doorbell can thus be connected to the existing household AC power supply and the existing signaling device without causing inadvertent sounding of the signaling device.

Another aspect of the present embodiments includes the realization that, in current A/V recording and communication doorbell systems other than the present embodiments, using the camera alone for detecting motion may have drawbacks under certain circumstances. For example, during nighttime hours the level of ambient light about the doorbell may be low. Since the camera detects motion by comparing successive video frames, if there is inadequate light to illuminate the field of view of the camera, then the camera may be unable to detect changes in successive video frames. Providing an illumination source, such as infrared LEDs, during nighttime hours may compensate for this issue. However, infrared LEDs may have range limitations. For example, infrared LEDs may not be well suited for illuminating the camera's field of view beyond a certain distance, such as about fifteen feet. The present embodiments solve this problem by providing a motion sensor in addition to the camera. For example, in some of the present embodiments the motion sensor may comprise one or more passive infrared (PIR) sensors. PIR sensors detect changes in the amount of IR radiation impinging upon them, which varies depending on the temperature and/or surface characteristics of the object(s) in front of the sensors. PIR sensors are thus effective at detecting motion even under low light conditions, particularly motion of persons and other objects that generate heat. Further, the PIR sensors may be effective at detecting objects at great distances from the camera, such as thirty feet or more. The PIR sensors thus may provide increased range as compared to infrared LEDs. In some of the present embodiments, therefore, the PIR sensors enhance the motion detecting capabilities of the doorbell, particularly when there is a low level of ambient light about the doorbell. In some embodiments, one or more of the PIR sensors may comprise a pyroelectric infrared sensor.

Yet another aspect of the present embodiments includes the realization that, in current A/V recording and communication doorbell systems other than the present embodiments, under nighttime or low ambient light conditions reflected infrared light can confuse the camera as to the actual light intensity in the camera's field of view. For example, if the doorbell is located opposite a wall or other structure that reflects a significant amount of the infrared light from the infrared light source, the image seen by the camera may appear to be very bright, which may confuse the camera as to the actual light intensity level in the field of view. The present embodiments solve this problem by providing a light sensor in addition to the camera. The light sensor may be configured to detect light in both the infrared and visible spectrums, and to provide information to the processor about the intensity of light in these spectrums in the camera's field of view.

Still another aspect of the present embodiments includes the realization that, in current A/V recording and communication devices, such as doorbell systems, other than the present embodiments, even if motion detection is falsely triggered, or if an object that caused motion detection is no longer within the field of view, the A/V recording and communication device may unnecessarily continue to record and/or stream video footage. Conversely, the A/V recording and communication device may cease recording and/or streaming video footage even when the object is still within the field of view. Some of the present embodiments solve these problems by tracking an object and streaming video footage for only about as long as the object that caused motion detection remains within the field of view. In addition, the present embodiments may use a timer to determine when to end streaming and/or to customize the length of time between when an object is no longer detected and when streaming is ended. The present A/V recording and communication devices may thus improve streaming video and reduce unwanted notifications to a client device.

Still another aspect of the present embodiments includes the realization that, in current A/V recording and communication devices, such as doorbell systems, other than the present embodiments, false positive motion detections can sometimes occur. Some of the present embodiments solve this problem by leveraging the functionalities and advantages of the camera and the motion sensor so that these separate devices can be used to check one another. For example, if the camera detects motion, then recording and/or streaming may not begin until the motion sensor confirms that the motion detection by the camera was valid. Conversely, if the motion sensor detects motion, then recording and/or streaming may not begin until the camera confirms that the motion detection by the motion sensor was valid. If the second device cannot confirm a valid motion detection, then recording and/or streaming will not occur and the user will not receive a false positive motion alert.

In a first aspect, a method for an audio/video (A/V) recording and communication doorbell system is provided, the A/V recording and communication doorbell including a camera, a speaker, a microphone, a power manager, a battery, an AC/DC rectifier, and a DC/DC converter, wherein the A/V recording and communication doorbell is connected to an external AC power source through the AC/DC rectifier and the DC/DC converter, the method comprising the power manager drawing power, up to a threshold power, from the AC power source, wherein the threshold power is measured at an output of the DC/DC converter; and when the power drawn from the AC power source reaches the threshold power, the power manager drawing supplemental power from the battery such that the power drawn from the AC power source never exceeds the threshold power as measured at the output of the DC/DC converter.

In an embodiment of the first aspect, the threshold power as measured at the output of the DC/DC converter is about 1.4 A.

In another embodiment of the first aspect, the A/V recording and communication doorbell further includes a button and an electronic switch, wherein when the button is depressed the electronic switch closes, thereby diverting power from the AC power source away from the power manager.

In another embodiment of the first aspect, when the electronic switch closes power from the AC power source is diverted through a signaling device to cause the signaling device to emit a sound.

In another embodiment of the first aspect, prior to the electronic switch closing, the power drawn from the AC power source flows through the signaling device and a shunt connected in parallel with the signaling device.

In another embodiment of the first aspect, prior to the electronic switch closing the shunt is in a low impedance state.

In another embodiment of the first aspect, when the electronic switch closes the shunt transitions to a high impedance state.

In another embodiment of the first aspect, the signaling device is electro-mechanical or electronic.

In another embodiment of the first aspect, the signaling device is external to the A/V recording and communication doorbell.

In another embodiment of the first aspect, the A/V recording and communication doorbell further includes a timer, wherein when the button is depressed the timer is activated and the electronic switch remains closed until the timer expires, unless the A/V recording and communication doorbell receives a notification that a call to a client device has been answered.

Another embodiment of the first aspect further comprises the electronic switch opening when the A/V recording and communication doorbell receives the notification that the call to the client device has been answered.

In another embodiment of the first aspect, the timer is a first timer and the A/V recording and communication doorbell further includes a second timer, the method further comprising the electronic switch opening, the second timer being activated when the electronic switch opens, and the electronic switch being prevented from closing again until after the second timer expires.

Another embodiment of the first aspect further comprises the A/V recording and communication doorbell, in response to the button being depressed, sending an alert signal and a video signal to a network device, the video signal including images captured by the camera.

Another embodiment of the first aspect further comprises, when the power drawn from the AC power source is below the threshold power, the power manager directing a portion of the power drawn from the AC power source to the battery to charge the battery.

In a second aspect, an audio/video (A/V) recording and communication doorbell system is provided, the A/V recording and communication doorbell comprising an A/V recording and communication doorbell including a camera, a speaker, a microphone, a power manager, a battery, an AC/DC rectifier, and a DC/DC converter, wherein the A/V recording and communication doorbell is connected to an external AC power source through the AC/DC rectifier and the DC/DC converter; wherein the power manager is configured to draw power, up to a threshold power, from the AC power source, wherein the threshold power is measured at an output of the DC/DC converter; and when the power drawn from the AC power source reaches the threshold power, the power manager is further configured to draw supplemental power from the battery such that the power drawn from the AC power source never exceeds the threshold power as measured at the output of the DC/DC converter.

In an embodiment of the second aspect, the threshold power as measured at the output of the DC/DC converter is about 1.4 A.

In another embodiment of the second aspect, the A/V recording and communication doorbell further includes a button and an electronic switch, wherein when the button is depressed the electronic switch is configured to close, thereby diverting power from the AC power source away from the power manager.

In another embodiment of the second aspect, the A/V recording and communication doorbell is further configured such that when the electronic switch closes power from the AC power source is diverted through a signaling device to cause the signaling device to emit a sound.

Another embodiment of the second aspect further comprises a shunt, wherein the A/V recording and communication doorbell is further configured such that, prior to the electronic switch closing, the power drawn from the AC power source flows through the signaling device and the shunt connected in parallel with the signaling device.

In another embodiment of the second aspect, prior to the electronic switch closing the shunt is in a low impedance state.

In another embodiment of the second aspect, when the electronic switch closes the shunt transitions to a high impedance state.

In another embodiment of the second aspect, the signaling device is electro-mechanical or electronic.

In another embodiment of the second aspect, the signaling device is external to the A/V recording and communication doorbell.

In another embodiment of the second aspect, the A/V recording and communication doorbell further includes a timer, wherein the A/V recording and communication doorbell is further configured such that when the button is depressed the timer is activated and the electronic switch remains closed until the timer expires, unless the A/V recording and communication doorbell receives a notification that a call to a client device has been answered.

In another embodiment of the second aspect, the electronic switch is configured to open when the A/V recording and communication doorbell receives the notification that the call to the client device has been answered.

In another embodiment of the second aspect, the timer is a first timer and the A/V recording and communication doorbell further includes a second timer, wherein the A/V recording and communication doorbell is further configured such that when the electronic switch opens the second timer is activated and the electronic switch is prevented from closing again until after the second timer expires.

In another embodiment of the second aspect, the A/V recording and communication doorbell is further configured to send, in response to the button being depressed, an alert signal and a video signal to a network device, the video signal including images captured by the camera.

In another embodiment of the second aspect, the A/V recording and communication doorbell is further configured such that when the power drawn from the AC power source is below the threshold power, the power manager directs a portion of the power drawn from the AC power source to the battery to charge the battery.

In a third aspect, a method for an audio/video (A/V) recording and communication doorbell system is provided, the A/V recording and communication doorbell including a camera, a speaker, a microphone, a button, and an electronic switch, wherein the A/V recording and communication doorbell is connected to an external power source, the method comprising the A/V recording and communication doorbell drawing power from the power source; the power flowing through a signaling device and a shunt connected in parallel with the signaling device, wherein the shunt is in a low impedance state; and when the button is depressed, the electronic switch closing and the shunt transitioning to a high impedance state, thereby diverting power from the power source through the signaling device to cause the signaling device to emit a sound.

In an embodiment of the third aspect, the signaling device is electro-mechanical or electronic.

In another embodiment of the third aspect, the signaling device is external to the A/V recording and communication doorbell.

In another embodiment of the third aspect, the A/V recording and communication doorbell further includes a timer, wherein when the button is depressed the timer is activated and the electronic switch remains closed until the timer expires, unless the A/V recording and communication doorbell receives a notification that a call to a client device has been answered.

Another embodiment of the third aspect further comprises the electronic switch opening when the A/V recording and communication doorbell receives the notification that the call to the client device has been answered.

In another embodiment of the third aspect, the timer is a first timer and the A/V recording and communication doorbell further includes a second timer, the method further comprising the electronic switch opening, the second timer being activated when the electronic switch opens, and the electronic switch being prevented from closing again until after the second timer expires.

Another embodiment of the third aspect further comprises the A/V recording and communication doorbell, in response to the button being depressed, sending an alert signal and a video signal to a network device, the video signal including images captured by the camera.

In another embodiment of the third aspect, the A/V recording and communication doorbell further comprises a rechargeable battery.

Another embodiment of the third aspect further comprises, in response to the button being depressed, comparing a power level of the rechargeable battery to a threshold value.

Another embodiment of the third aspect further comprises the electronic switch closing only if the power level of the rechargeable battery is equal to or greater than the threshold value.

In a fourth aspect, an audio/video (A/V) recording and communication doorbell system is provided, comprising an A/V recording and communication doorbell including a camera, a speaker, a microphone, a button, and an electronic switch, wherein the A/V recording and communication doorbell is connected to an external power source; wherein the A/V recording and communication doorbell is configured to draw power from the power source such that the power flows through a signaling device and a shunt connected in parallel with the signaling device, wherein the shunt is in a low impedance state; and when the button is depressed, the electronic switch is configured to close, thereby transitioning the shunt to a high impedance state and diverting power from the power source through the signaling device to cause the signaling device to emit a sound.

In an embodiment of the fourth aspect, the signaling device is electro-mechanical or electronic.

In another embodiment of the fourth aspect, the signaling device is external to the A/V recording and communication doorbell.

In another embodiment of the fourth aspect, the A/V recording and communication doorbell further includes a timer, wherein the A/V recording and communication doorbell is further configured such that when the button is depressed the timer is activated and the electronic switch remains closed until the timer expires, unless the A/V recording and communication doorbell receives a notification that a call to a client device has been answered.

In another embodiment of the fourth aspect, the electronic switch is configured to open when the A/V recording and communication doorbell receives the notification that the call to the client device has been answered.

In another embodiment of the fourth aspect, the timer is a first timer and the A/V recording and communication doorbell further includes a second timer, wherein the A/V recording and communication doorbell is further configured such that when the electronic switch opens the second timer is activated and the electronic switch is prevented from closing again until after the second timer expires.

In another embodiment of the fourth aspect, the A/V recording and communication doorbell is further configured to send, in response to the button being depressed, an alert signal and a video signal to a network device, the video signal including images captured by the camera.

In another embodiment of the fourth aspect, the A/V recording and communication doorbell further comprises a rechargeable battery.

In another embodiment of the fourth aspect, the A/V recording and communication doorbell is further configured to, in response to the button being depressed, compare a power level of the rechargeable battery to a threshold value.

In another embodiment of the fourth aspect, the A/V recording and communication doorbell is further configured to close the electronic switch only if the power level of the rechargeable battery is equal to or greater than the threshold value.

In a fifth aspect, an audio/video (A/V) recording and communication doorbell is provided, comprising a housing having an enclosure; a camera located at least partially within the enclosure; a speaker located at least partially within the enclosure; a microphone located at least partially within the enclosure; a button located at least partially within the enclosure and protruding outwardly from a front of the enclosure; and a shield located at the front of the enclosure; wherein the shield includes an upper portion that extends along the front of the enclosure above the button and a lower portion that extends along the front of the enclosure below the button; and wherein the camera is located behind the upper portion of the shield.

In an embodiment of the fifth aspect, the upper portion of the shield and the lower portion of the shield are separate pieces.

In another embodiment of the fifth aspect, the upper portion of the shield is transparent or translucent.

In another embodiment of the fifth aspect, the lower portion of the shield is transparent to infrared light, but partially or mostly opaque with respect to light in the visible spectrum.

Another embodiment of the fifth aspect further comprises a shell overlying the enclosure.

In another embodiment of the fifth aspect, the shell includes a recess that is sized and shaped to receive the enclosure in a close fitting engagement, such that outer surfaces of the enclosure abut conforming inner surfaces of the shell.

Another embodiment of the fifth aspect further comprises a back plate secured to a rear of the enclosure, wherein the back plate is sized and shaped such that edges of the back plate extend outward from edges of the enclosure, thereby creating a lip against which the shell abuts when the shell is mated with the enclosure.

In another embodiment of the fifth aspect, the shell includes a central opening in a front surface.

In another embodiment of the fifth aspect, the central opening is sized and shaped to accommodate the shield.

In another embodiment of the fifth aspect, the shield resides within the central opening of the shell such that a front surface of the shield is substantially flush with a front surface of the shell and there is little or no gap between outer edges of the shield and inner edges of the central opening in the shell.

In a sixth aspect, an audio/video (A/V) recording and communication doorbell is provided, comprising a housing having an enclosure; a camera located at least partially within the enclosure; a speaker located at least partially within the enclosure; a microphone located at least partially within the enclosure; a button located at least partially within the enclosure and protruding outwardly from a front of the enclosure; and a plurality of shells configured to overlie the enclosure; wherein each of the shells includes a recess that is sized and shaped to receive the enclosure in a close fitting engagement, such that outer surfaces of the enclosure abut conforming inner surfaces of each of the shells; and wherein each of the shells is a different color.

Another embodiment of the sixth aspect further comprises a shield located at the front of the enclosure.

In another embodiment of the sixth aspect, each of the shells includes a central opening in a front surface.

In another embodiment of the sixth aspect, the central opening is sized and shaped to accommodate the shield.

In another embodiment of the sixth aspect, the shield is configured to reside within the central opening of each of the shells such that a front surface of the shield is substantially flush with a front surface of each of the shells and there is little or no gap between outer edges of the shield and inner edges of the central opening in each of the shells.

In a seventh aspect, an audio/video (A/V) recording and communication doorbell is provided, comprising a camera; a speaker; a microphone; a front button; and a motion sensor; wherein the camera and the motion sensor are configured to work in tandem to detect motion in a field of view of the A/V recording and communication doorbell such that a first one of the camera and the motion sensor detects motion and the other one of the camera and the motion sensor independently verifies the motion detection before an alert is sent to a user's client device.

In an embodiment of the seventh aspect, when the motion sensor triggers a motion detection, the camera independently verifies the motion detection before the alert is sent to the user's client device.

In another embodiment of the seventh aspect, when the camera triggers a motion detection, the motion sensor independently verifies the motion detection before the alert is sent to the user's client device.

In another embodiment of the seventh aspect, the motion sensor comprises a passive infrared (PIR) sensor.

In an eighth aspect, an audio/video (A/V) recording and communication device is provided, comprising a camera configured to capture image data of an object within a field of view of the camera; a communication module; and a processing module operatively connected to the camera and to the communication module, the processing module comprising: a processor; and a motion detection application, wherein the motion detection application configures the processor to: detect motion of the object within the field of view of the camera; capture image data of the object using the camera; track the object within the field of view using the camera; stream the image data to a client device using the communication module; determine when the object is no longer detected within the field of view using the camera; start a timer upon determining that the object is no longer detected within the field of view; and stop capturing the image data, tracking the object, and streaming the image data upon expiration of the timer.

In an embodiment of the eighth aspect, the motion detection application further configures the processor to search for the object within the field of view while the timer is running.

In another embodiment of the eighth aspect, wherein the motion detection application further configures the processor to stop the timer before expiration if the object is found within the field of view.

In another embodiment of the eighth aspect, the motion detection application further configures the processor to restart the timer if the object is again no longer detected within the field of view.

In another embodiment of the eighth aspect, the motion detection application further configures the processor to generate an alert when the motion of the object within the field of view of the camera is detected, and to transmit the alert to the client device using the communication module.

Another embodiment of the eighth aspect further comprises a motion sensor configured to detect the motion of the object within the field of view of the camera.

In another embodiment of the eighth aspect, the motion detection application further configures the processor to detect the motion of the object within the field of view of the camera using the camera.

In another embodiment of the eighth aspect, the motion detection application further configures the processor to confirm, using the motion sensor, the detection, by the camera, of the motion of the object within the field of view of the camera.

In another embodiment of the eighth aspect, the motion detection application further configures the processor to not track the object, stream the image data, nor start the timer if the detection of the motion of the object within the field of view of the camera is not confirmed.

In another embodiment of the eighth aspect, the motion detection application further configures the processor to detect the motion of the object within the field of view of the camera using the motion sensor.

In another embodiment of the eighth aspect, the motion detection application further configures the processor to confirm, using the camera, the detection, by the motion sensor, of the motion of the object within the field of view of the camera.

In another embodiment of the eighth aspect, the motion detection application further configures the processor to not track the object, stream the image data, nor start the timer if the detection of the motion of the object within the field of view of the camera is not confirmed.

In another embodiment of the eighth aspect, the motion detection application further configures the processor to set the camera into a low-power state.

In another embodiment of the eighth aspect, the motion detection application further configures the processor to transition the camera from the low-power state to an active state upon the detection of the motion of the object within the field of view of the camera using the motion sensor.

In another embodiment of the eighth aspect, the motion detection application further configures the processor to confirm, using the camera, the detection, by the motion sensor, of the motion of the object within the field of view of the camera.

In another embodiment of the eighth aspect, the motion detection application further configures the processor to transition the camera from the active state to the low-power state if the detection of the motion of the object within the field of view of the camera is not confirmed.

In another embodiment of the eighth aspect, the motion sensor comprises one or more passive infrared (PIR) sensors.

In another embodiment of the eighth aspect, the one or more PIR sensors detects changes in an amount of infrared (IR) radiation emitting from the object.

In another embodiment of the eighth aspect, the amount of IR radiation emitting from the object varies depending on temperature and/or surface characteristics of the object.

In another embodiment of the eighth aspect, the one or more of the PIR sensors may comprise a pyroelectric infrared sensor.

In a ninth aspect, a method for an audio/video (A/V) recording and communication device is provided, the A/V recording and communication device comprising a camera, a communication module, and a processing module operatively connected to the camera and to the communication module, the method comprising: detecting motion of an object within a field of view of the camera; capturing image data of the object using the camera; tracking the object within the field of view using the camera; streaming the image data to a client device using the communication module; determining when the object is no longer detected within the field of view using the camera; starting a timer upon determining that the object is no longer detected within the field of view; and stopping the capturing of the image data, tracking of the object, and streaming of the image data upon expiration of the timer.

An embodiment of the ninth aspect further comprises searching for the object within the field of view while the timer is running.

Another embodiment of the ninth aspect further comprises stopping the timer before expiration if the object is found within the field of view.

Another embodiment of the ninth aspect further comprises restarting the timer if the object is again no longer detected within the field of view.

Another embodiment of the ninth aspect further comprises generating an alert when the motion of the object within the field of view of the camera is detected and transmitting the alert to the client device using the communication module.

In another embodiment of the ninth aspect, the A/V recording and communication device further comprises a motion sensor configured to detect the motion of the object within the field of view of the camera.

Another embodiment of the ninth aspect further comprises detecting the motion of the object within the field of view of the camera using the camera.

Another embodiment of the ninth aspect further comprises confirming, using the motion sensor, the detection, by the camera, of the motion of the object within the field of view of the camera.

Another embodiment of the ninth aspect further comprises not tracking the object, streaming the image data, nor starting the timer if the detection of the motion of the object within the field of view of the camera is not confirmed.

Another embodiment of the ninth aspect further comprises detecting the motion of the object within the field of view of the camera using the motion sensor.

Another embodiment of the ninth aspect further comprises confirming, using the camera, the detection, by the motion sensor, of the motion of the object within the field of view of the camera.

Another embodiment of the ninth aspect further comprises not tracking the object, streaming the image data, or starting the timer if the detection of the motion of the object within the field of view of the camera is not confirmed.

Another embodiment of the ninth aspect further comprises setting the camera into a low-power state.

Another embodiment of the ninth aspect further comprises transitioning the camera from the low-power state to an active state upon the detection of the motion of the object within the field of view of the camera using the motion sensor.

Another embodiment of the ninth aspect further comprises confirming, using the camera, the detection, by the motion sensor, of the motion of the object within the field of view of the camera.

Another embodiment of the ninth aspect further comprises transitioning the camera from the active state to the low-power state if the detection of the motion of the object within the field of view of the camera is not confirmed.

In another embodiment of the ninth aspect, the motion sensor comprises one or more passive infrared (PIR) sensors.

In another embodiment of the ninth aspect, the one or more PIR sensors detects changes in an amount of infrared (IR) radiation emitting from the object.

In another embodiment of the ninth aspect, the amount of IR radiation emitting from the object varies depending on temperature and/or surface characteristics of the object.

In another embodiment of the ninth aspect, the one or more of the PIR sensors may comprise a pyroelectric infrared sensor.

BRIEF DESCRIPTION OF THE DRAWINGS

The various embodiments of the present audio/video (A/V) recording and communication doorbells now will be discussed in detail with an emphasis on highlighting the advantageous features. These embodiments depict the novel and non-obvious A/V recording and communication doorbells shown in the accompanying drawings, which are for illustrative purposes only. These drawings include the following figures, in which like numerals indicate like parts:

FIGS. 18 and 19 are waveform diagrams for the first comparator circuit of FIG. 16;

DETAILED DESCRIPTION

Figure 1:
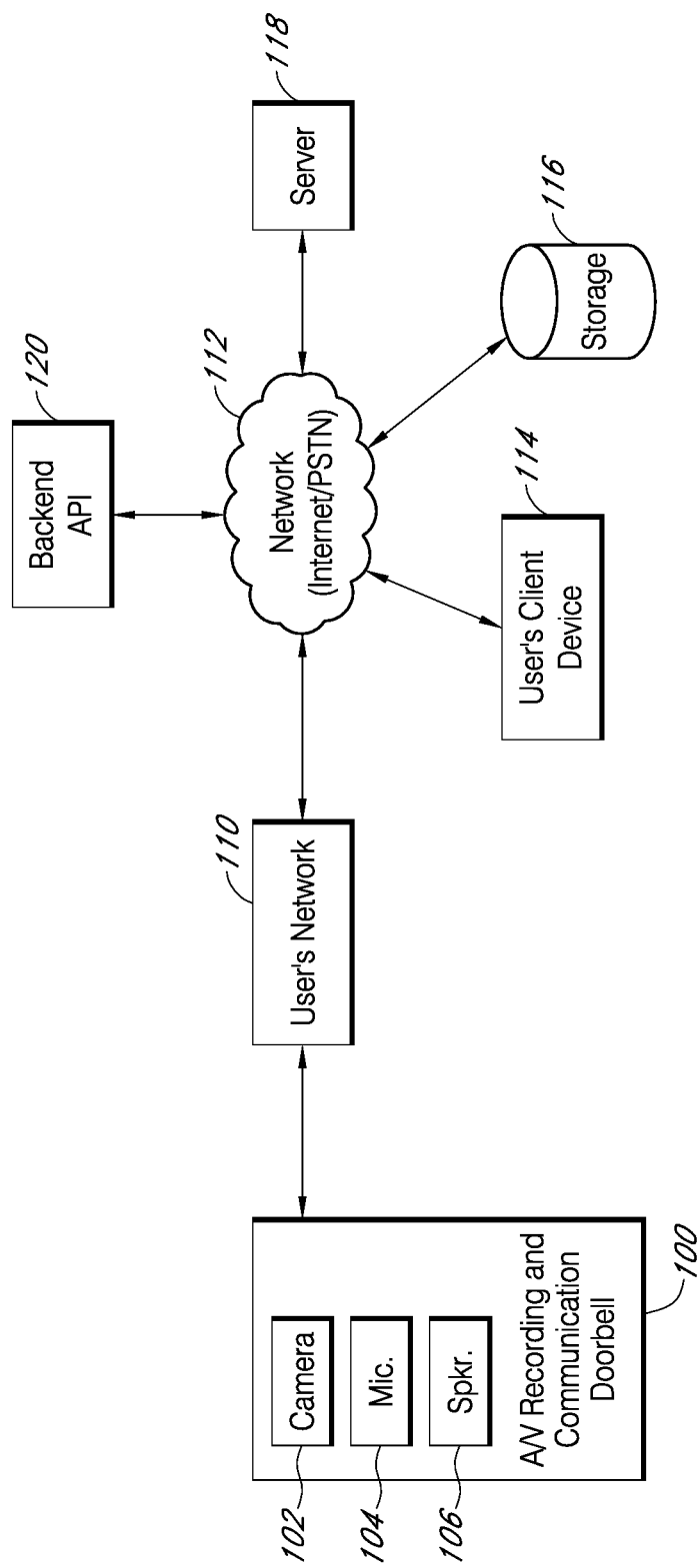
FIG. 1 is a functional block diagram illustrating an A/V recording and communication doorbell system according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video (A/V) recording and communication doorbells are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication doorbell 100. The A/V recording and communication doorbell 100 is typically located near the entrance to a structure (not shown), such as a dwelling, a business, a storage facility, etc., or in any other location. The A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be, for example, a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence by detecting motion using the camera 102 and/or a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have a very limited state.

The backend API 120 illustrated in FIG. 1 may include one or more APIs. An API is a set of routines, protocols, and tools for building software and applications. An API expresses a software component in terms of its operations, inputs, outputs, and underlying types, and defines functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
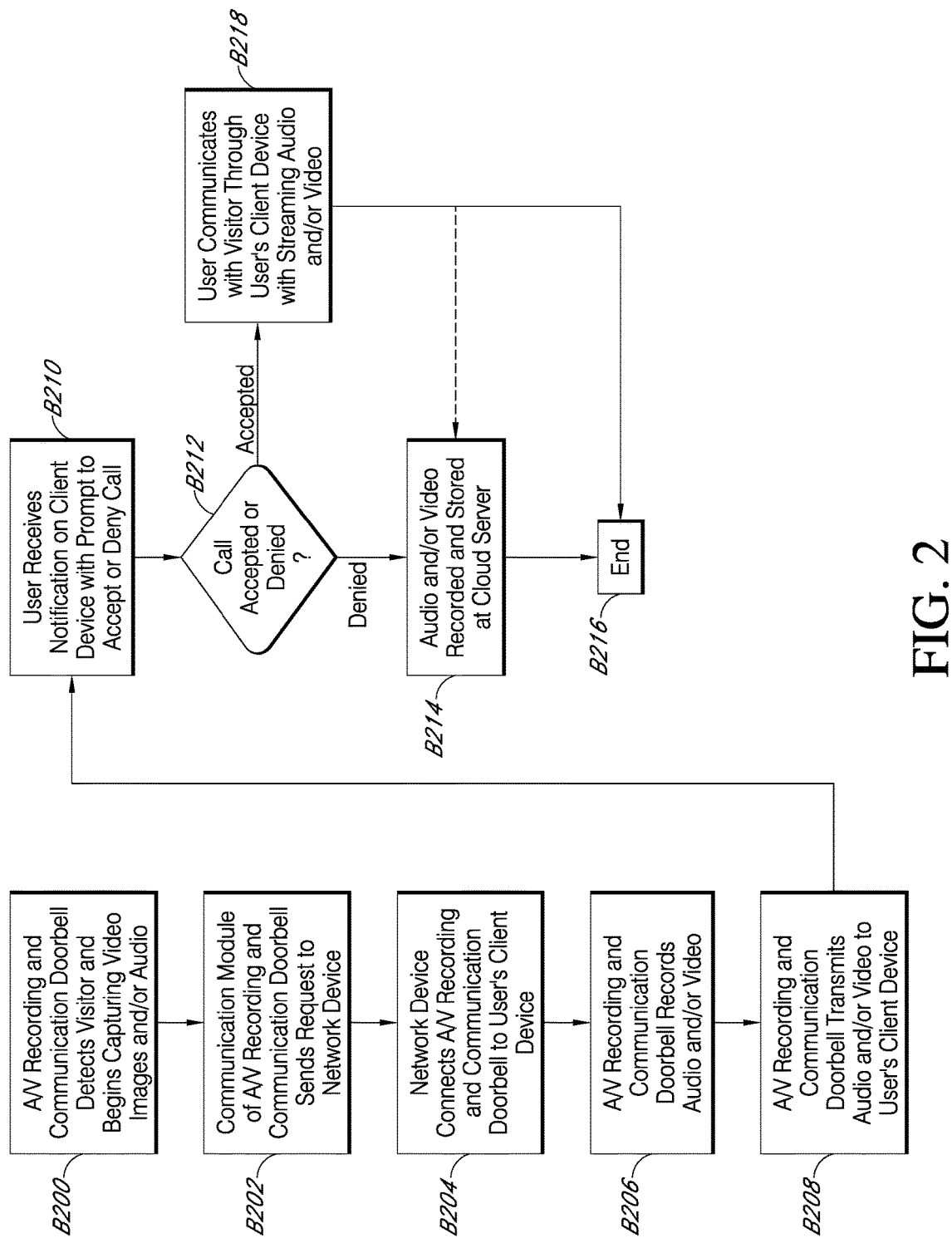
FIG. 2 is a flowchart illustrating a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication doorbell 100 detects the visitor's presence and begins capturing video images within a field of view of the camera 102. The A/V recording and communication doorbell 100 may also capture audio through the microphone 104. As described above, the A/V recording and communication doorbell 100 may detect the visitor's presence by detecting motion using the camera 102 and/or a motion sensor, and/or by detecting that the visitor has depressed the button on the A/V recording and communication doorbell 100.

At block B202, a communication module of the A/V recording and communication doorbell 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication doorbell 100 to the user's client device 114 through the user's network 110 and the network 112. At block B206, the A/V recording and communication doorbell 100 may record available audio and/or video data using the camera 102, the microphone 104, and/or any other sensor available. At block B208, the audio and/or video data is transmitted (streamed) from the A/V recording and communication doorbell 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication doorbell 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication doorbell 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
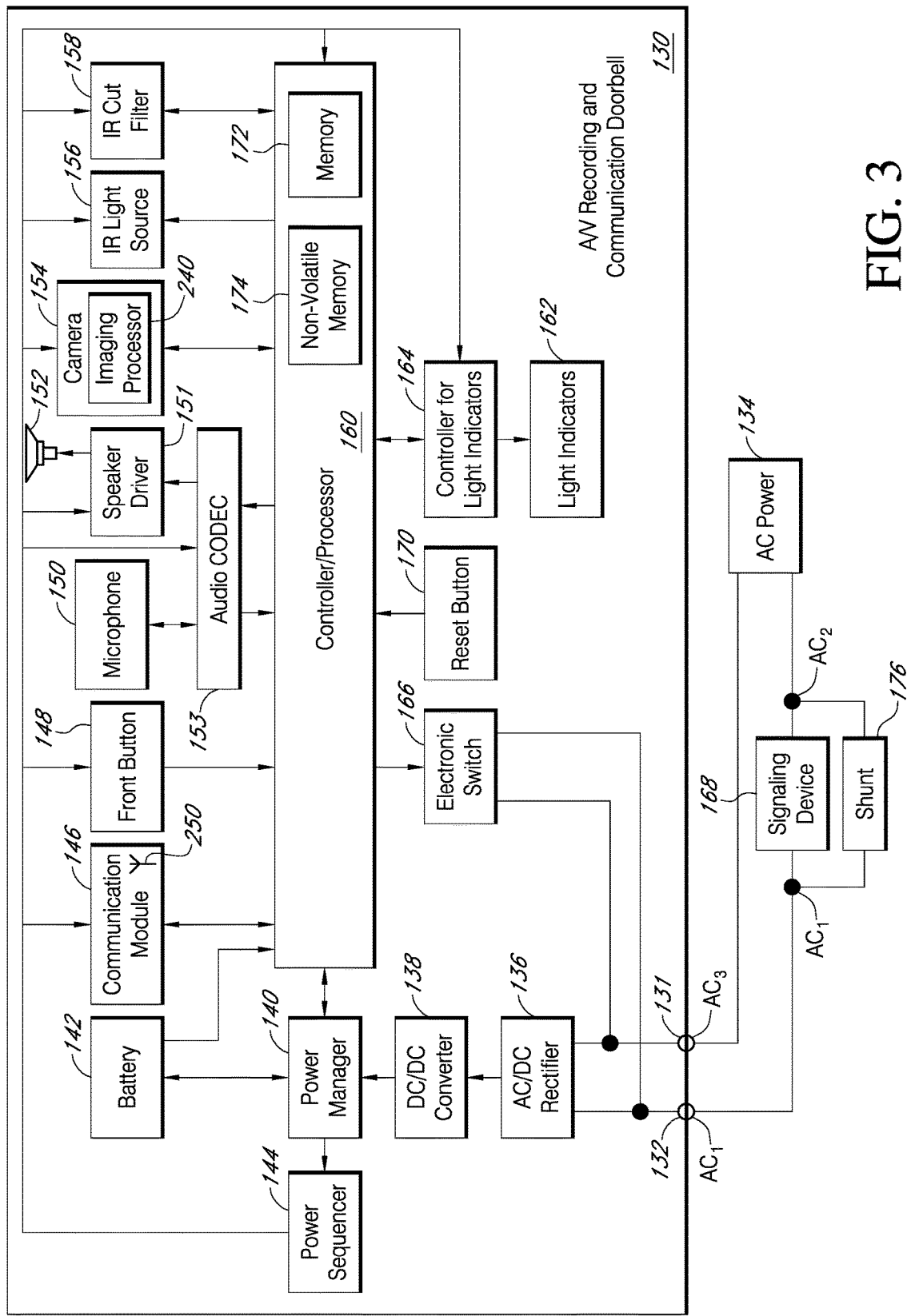
FIG. 3 is a functional block diagram illustrating an embodiment of an A/V recording and communication doorbell system according to the present disclosure.

FIGS. 3-13 illustrate one embodiment of an A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
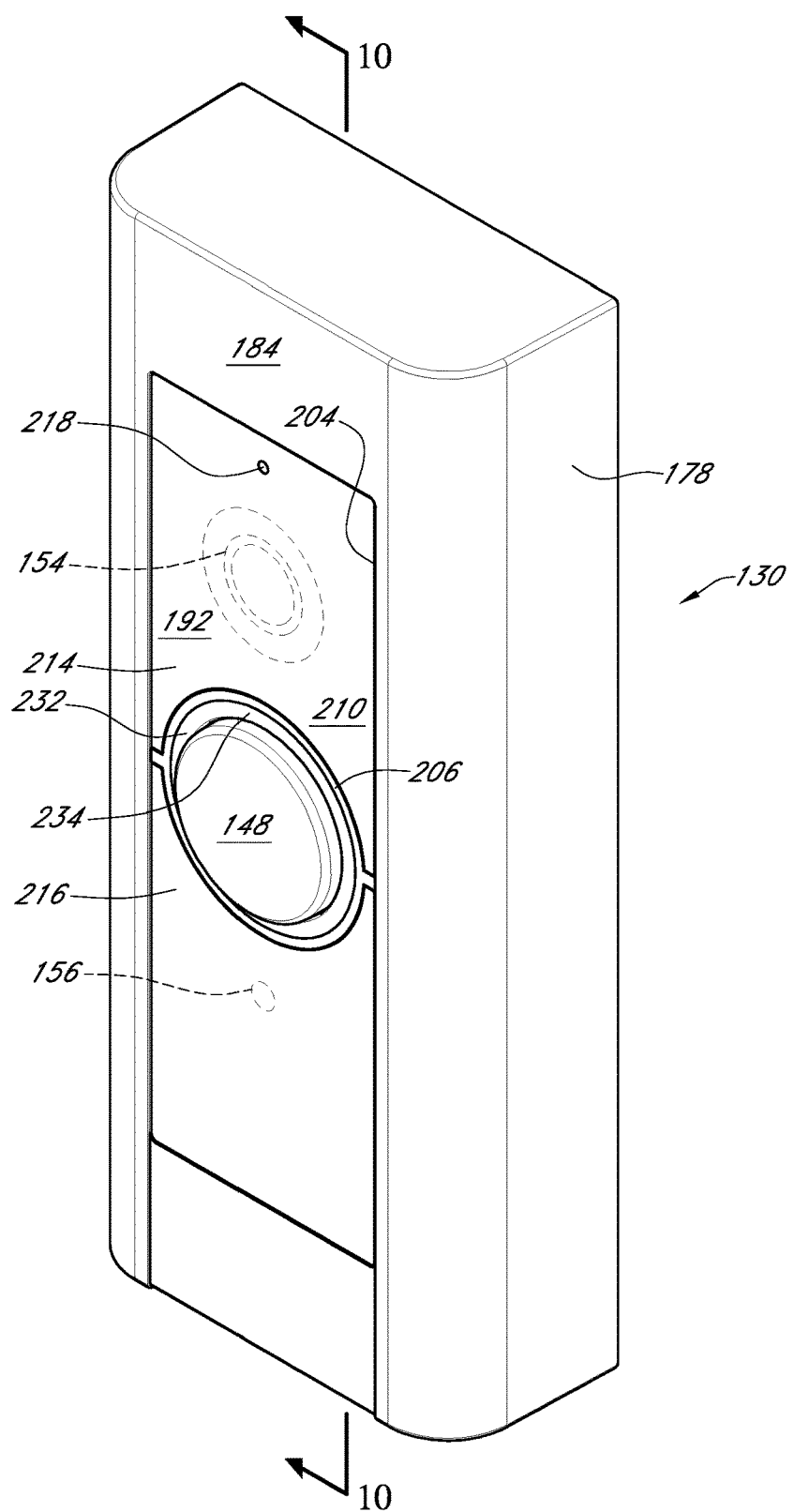
FIG. 4 is a front perspective view of an embodiment of an A/V recording and communication doorbell according to the present disclosure.
Figure 5:
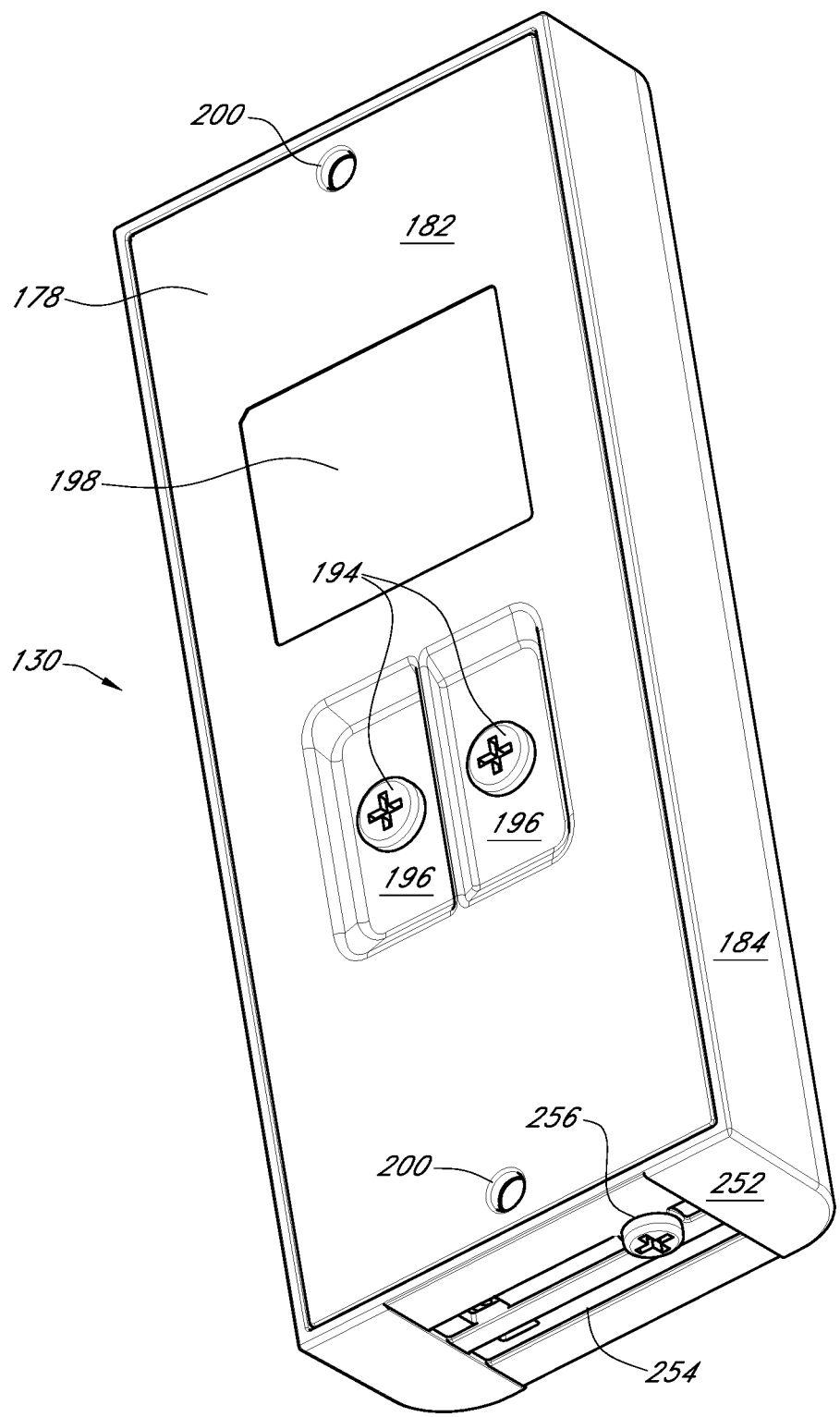
FIG. 5 is a rear perspective view of the A/V recording and communication doorbell of FIG. 4.
Figure 6:
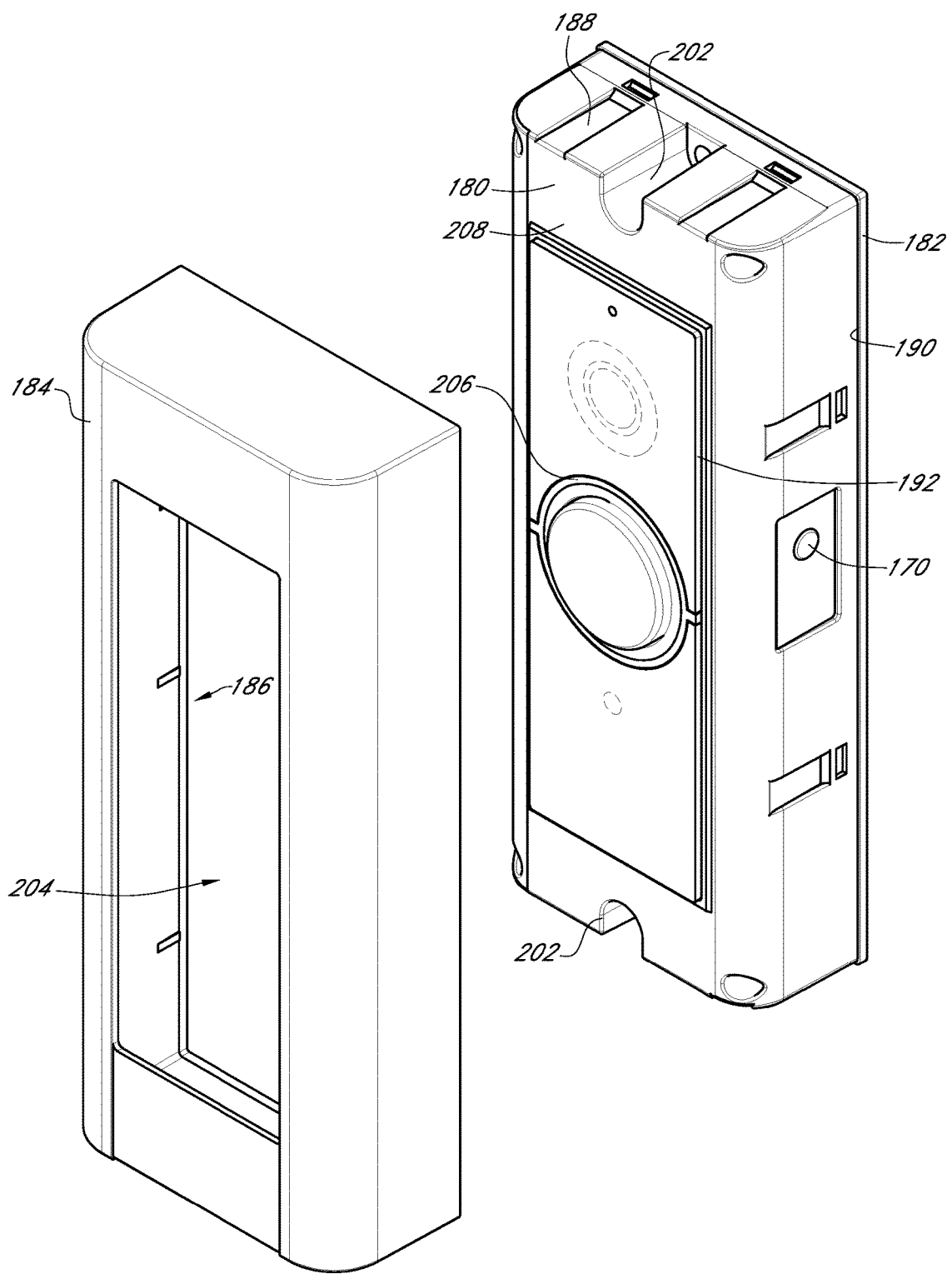
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device 114 to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device 114 and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent to its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
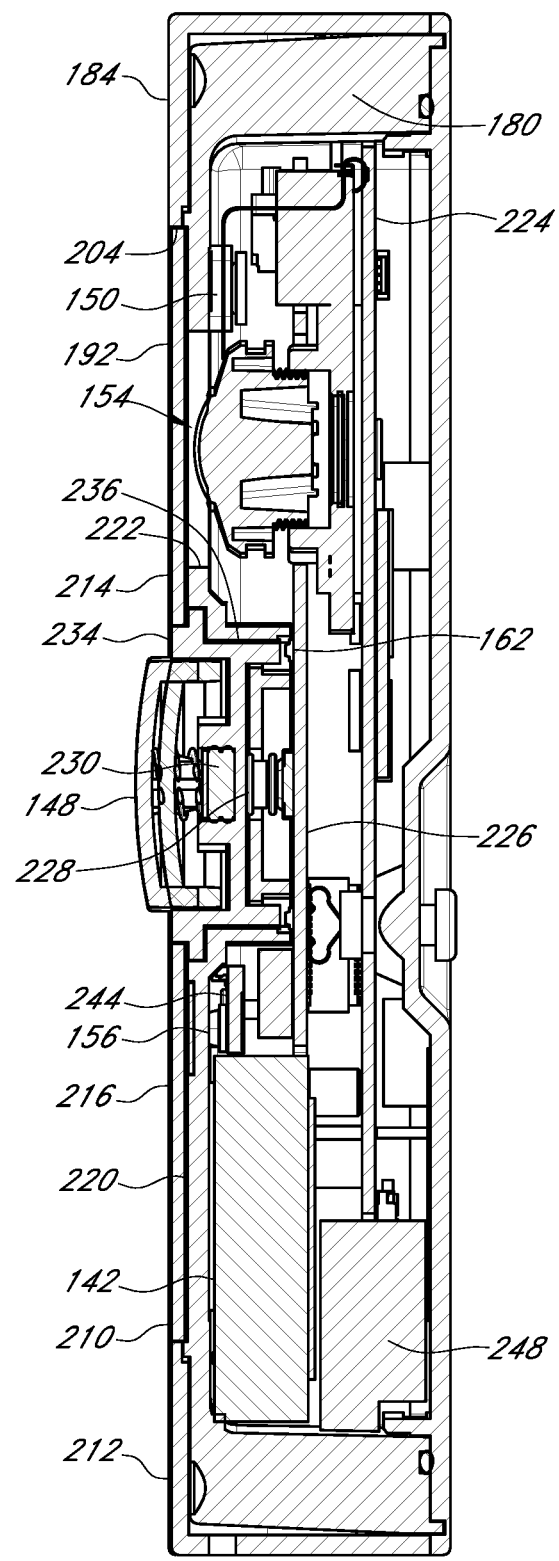
FIG. 10 is a right-side cross-sectional view of the A/V recording and communication doorbell of FIG. 4 taken through the line 9-9 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
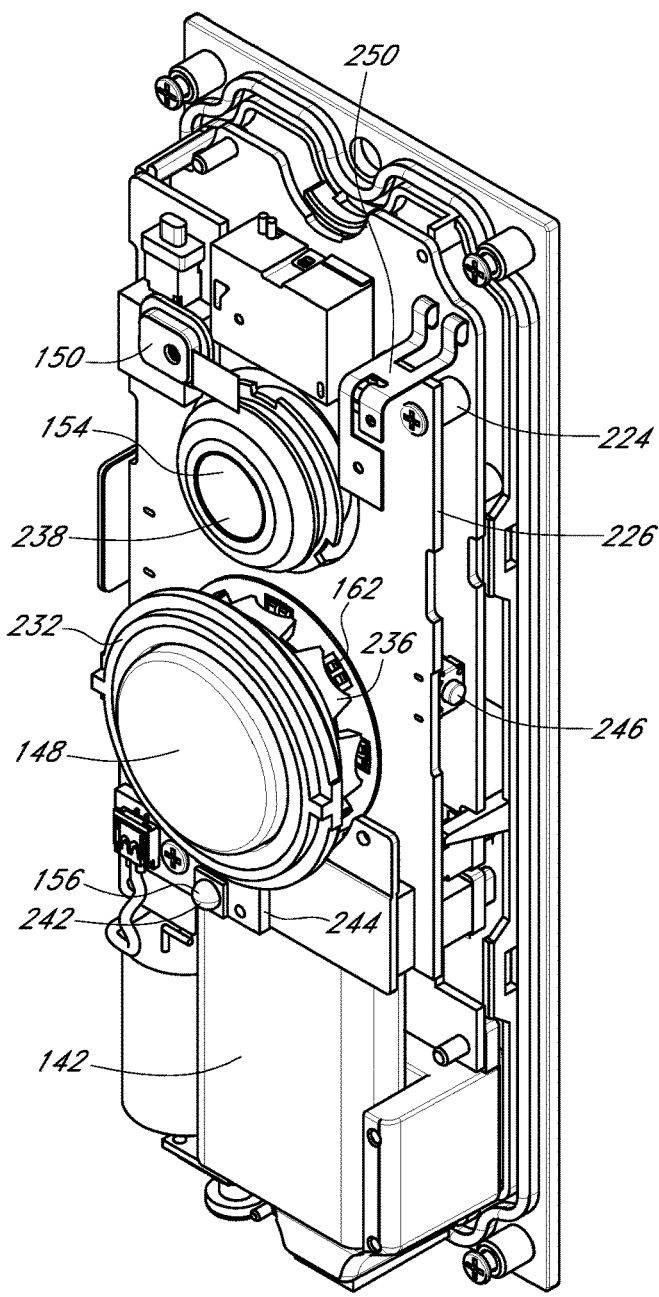
FIGS. 7, 8, and 9 are front perspective views of various internal components of the A/V recording and communication doorbell of FIG. 4.
Figure 8:
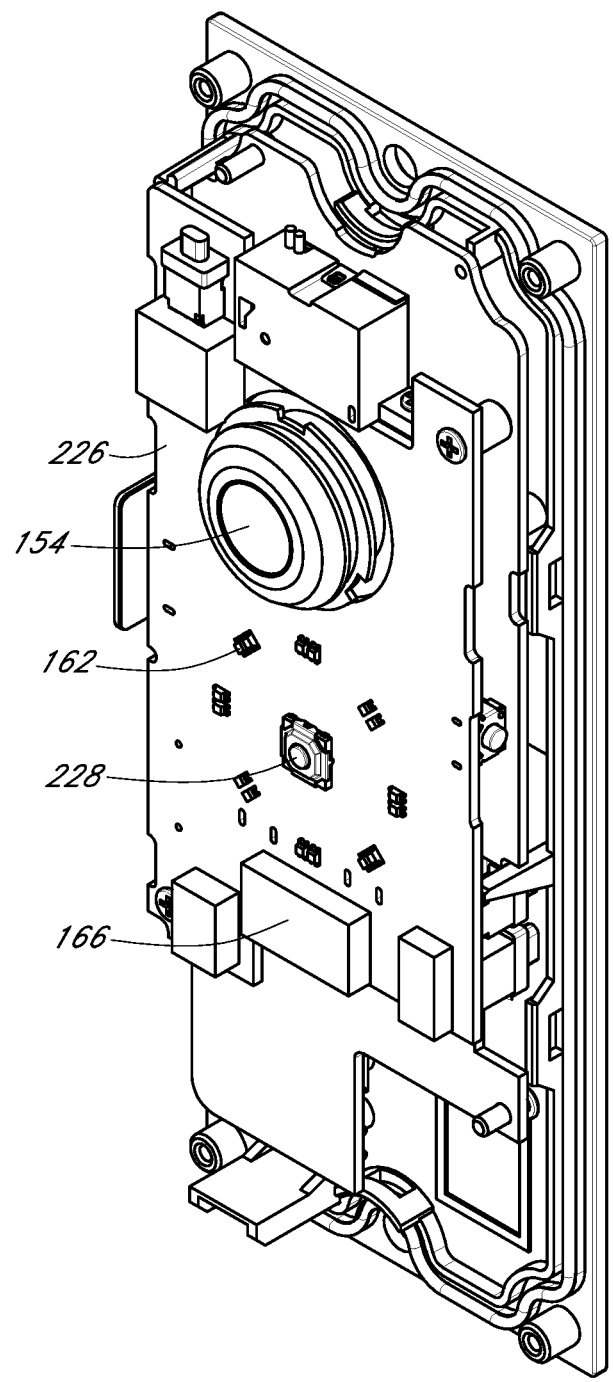
Figure 9:
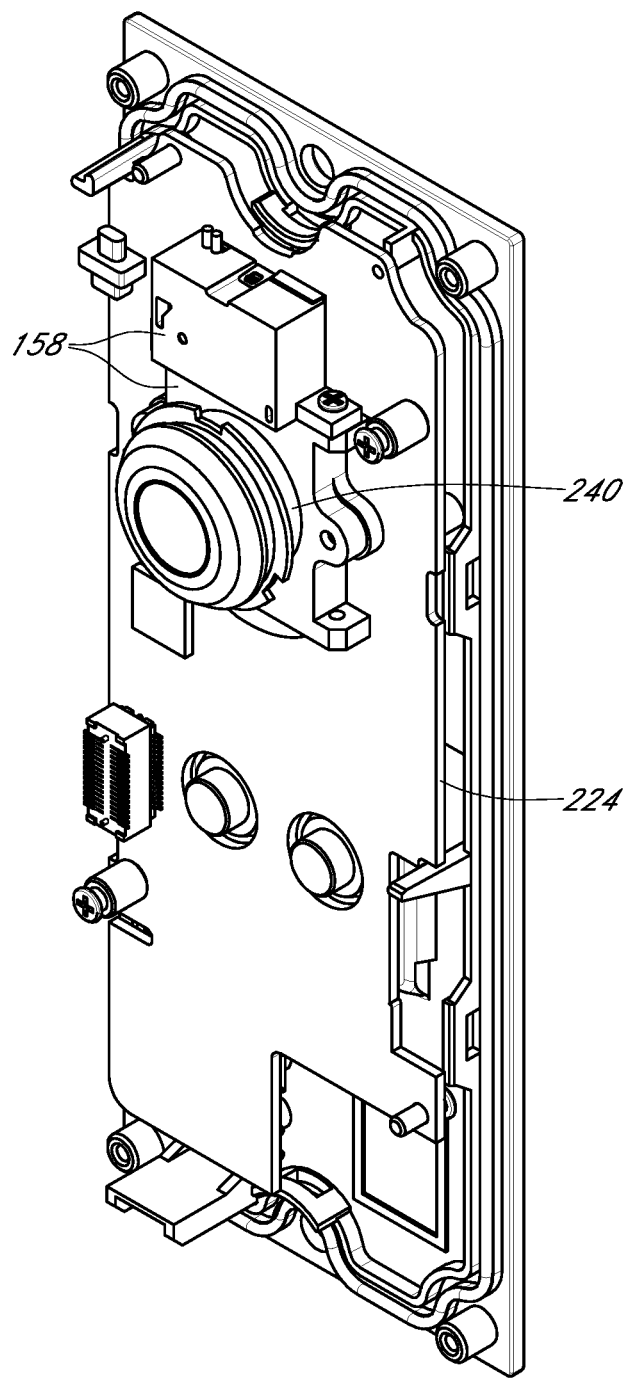

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

Figure 7A:
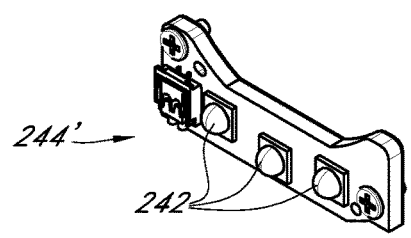
FIG. 7A is a front perspective view of another embodiment of an infrared (IR) light-emitting diode (LED) printed circuit board (PCB) according to various aspects of the present disclosure.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. FIG. 7A illustrates an alternative embodiment of the IR LED PCB 244' comprising three IR LEDs 242. In an embodiment including the IR LED PCB 244' of FIG. 7A, or including any IR LED PCB having more than one IR LED 242, the size of the third opening in the cover may be increased to accommodate the larger size of the IR LED PCB 244'.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 7) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
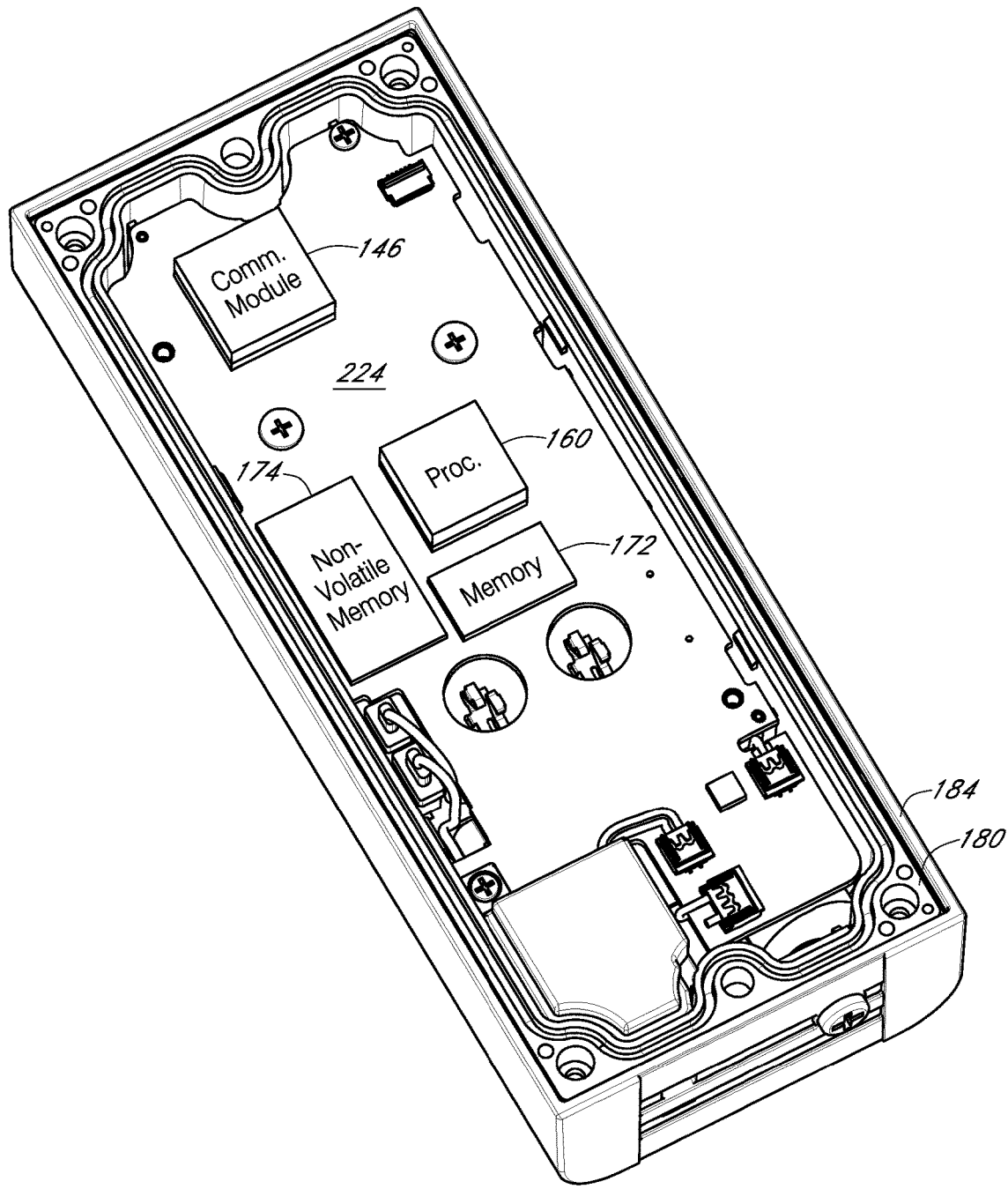
FIGS. 11-13 are rear perspective views of various internal components of the A/V recording and communication doorbell of FIG. 4.
Figure 12:
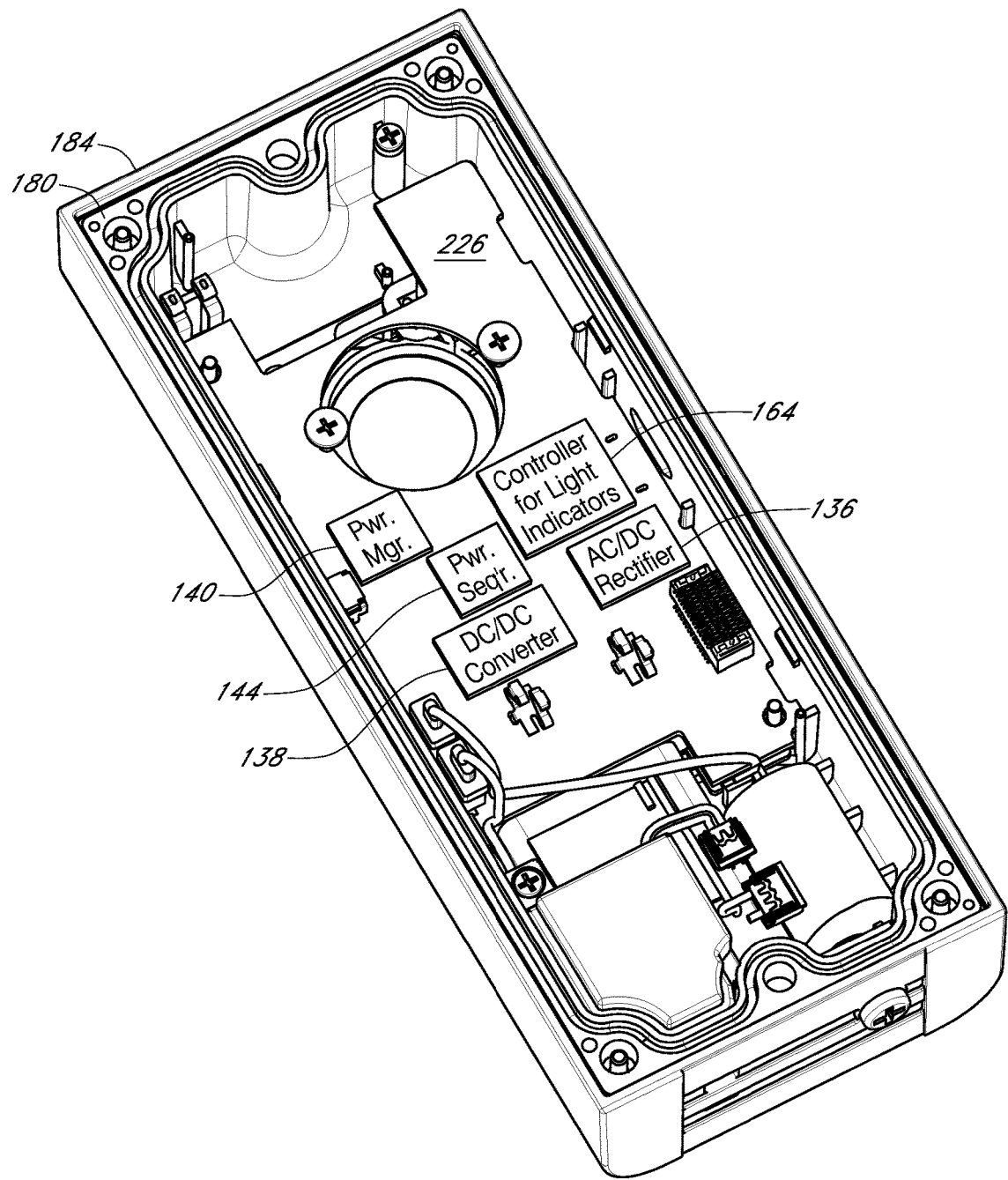
Figure 13:
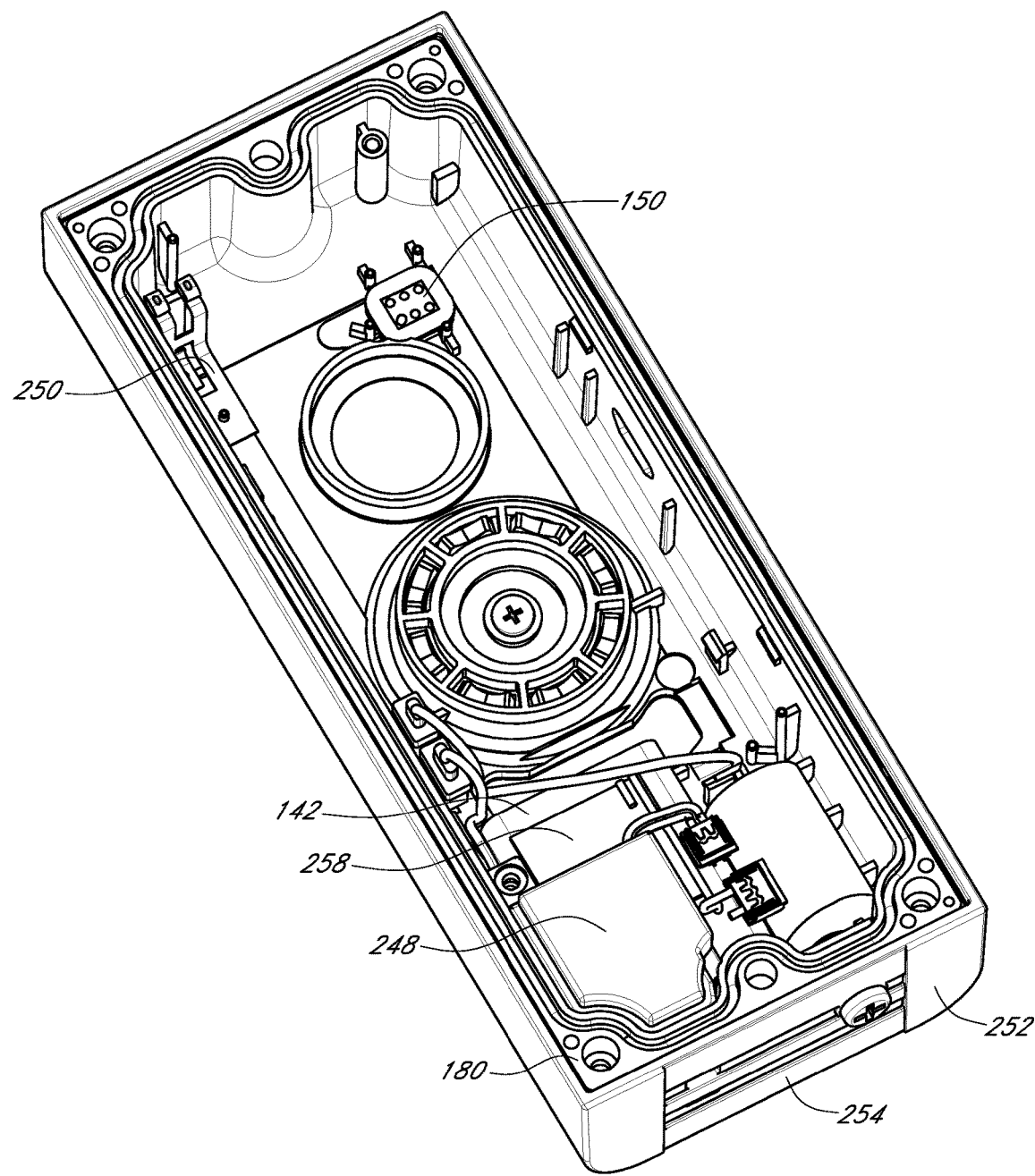

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

Figure 14:
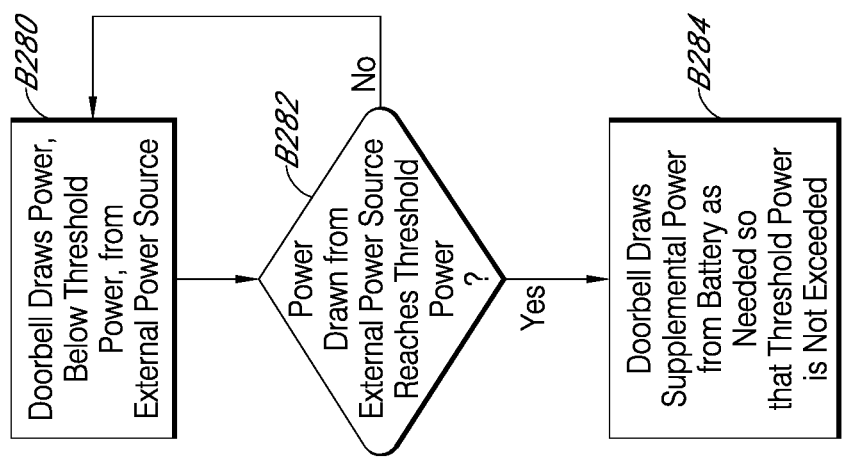
FIG. 14 is a flowchart illustrating a process according to various aspects of the present disclosure.

FIG. 14 is a flowchart illustrating an embodiment of a process for drawing supplemental power from the battery 142 of the present A/V recording and communication doorbell 130 in order to avoid inadvertent sounding of the connected signaling device 168. At block B280, the A/V recording and communication doorbell 130 draws power, below a threshold power, from an external power source. The external power source may be, for example, the AC power source 134, as shown in FIG. 3. The threshold power may be, for example, the power level at which the signaling device 168 (FIG. 3) would sound. In one non-limiting example, the threshold power may be measured at the output of the DC/DC converter 138 (FIG. 3). The threshold power may be measured by the power manager 140 (FIG. 3), for example. In one non-limiting example, the threshold power, as measured at the output of the DC/DC converter 138, may be equal to 1.4 A.

At block B282, the process determines whether the power drawn from the external power source 134 has reached the threshold power. In some embodiments, the power manager 140 (FIG. 3), for example, may determine whether the power drawn from the external power source 134 has reached the threshold power. If the power drawn from the external power source 134 has not reached the threshold power, then the process loops back to block B280. If, however, the power drawn from the external power source 134 has reached the threshold power, then the process moves to block B284. At block B284, the A/V recording and communication doorbell 130 draws supplemental power from the battery 142 as needed so that the power drawn from the external power source 134 does not exceed the threshold power. In this manner, the process of FIG. 14 avoids inadvertent sounding of the connected signaling device 168. Examples of scenarios where the power drawn from the external power source 134 might reach the threshold power include, but are not limited to, when switching the IR cut filter 158 from daytime mode to nighttime mode (and vice versa), or when a call is in progress between a visitor at the A/V recording and communication doorbell 130 and a user using a client device and the IR light source 156 is illuminated. In some embodiments, when the power being drawn from the external power source 134 is below the threshold power, the power manager 140 may direct a portion of the power drawn from the external power source 134 to the battery 142 in order to recharge the battery 142.

Figure 15:
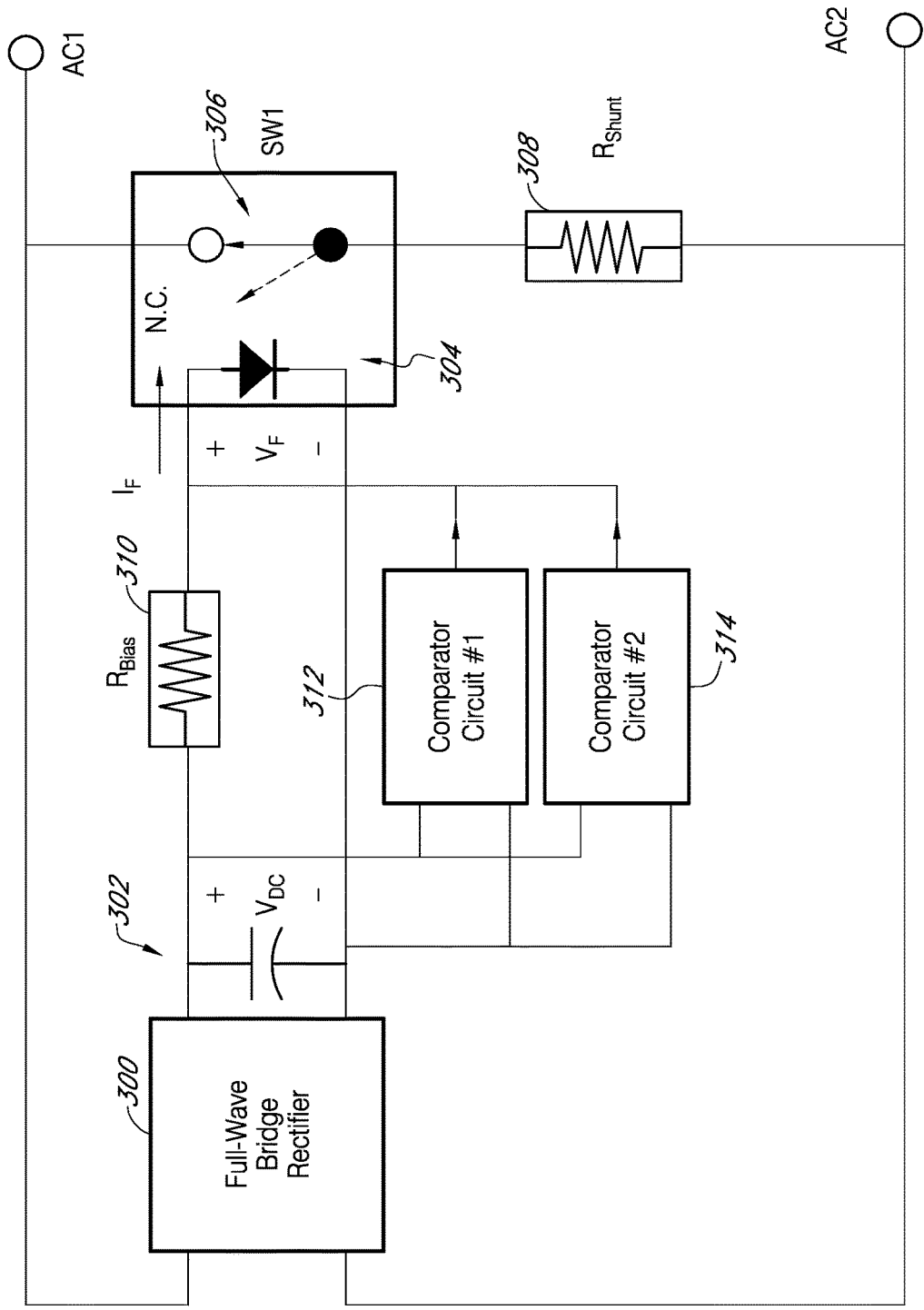
FIG. 15 is a functional block diagram illustrating an embodiment of a shunt according to the present disclosure.

As discussed above, and with reference back to FIG. 3, some of the present embodiments may include a shunt 176 connected in parallel across the terminals of the signaling device 168. The shunt 176 facilitates the ability of the A/V recording and communication doorbell 130 to draw power from the AC power source 134 without inadvertently triggering the signaling device 168. FIG. 15 illustrates an example embodiment of the shunt 176. With reference to FIG. 15, the shunt 176 comprises a full-wave bridge rectifier 300, a capacitor 302, a diode 304, a shunt switch 306, a first resistor $R_{Shunt}$ 308, and a second resistor $R_{Bias}$ 310. In some embodiments, the shunt switch 306 may be an opto-coupled switch, for example. The first resistor $R_{Shunt}$ 308 presents a relatively low electrical impedance, such as a few ohms for example, while the second resistor $R_{Bias}$ 310 presents a higher electrical impedance, such as >1K ohms for example.

During normal standby operation, the shunt switch 306 is closed. The shunt 176, therefore, presents a relatively low electrical impedance across the terminals $AC_1$, $AC_2$ of the signaling device 168, because the impedance of the first resistor $R_{Shunt}$ 308 is relatively low and the impedance of the switch is even lower, such as about 1 ohm or less in one example. Most of the current drawn by the A/V recording and communication doorbell 130, therefore, flows through the shunt 176, and not through the signaling device 168. When the front button 148 of the A/V recording and communication doorbell 130 is pressed, however, the electronic switch 166 closes, causing the voltage from the AC power source 134 to be impressed mostly across the shunt 176 and the signaling device 168 in parallel, while a small amount of voltage, such as about 1V in one example, is impressed across the electronic switch 166, if it is implemented as a triac for example. The circuitry in the shunt 176 senses the voltage across its terminals $AC_1$, $AC_2$, causing the shunt switch 306 to open, which puts the shunt 176 into a high impedance state. When the shunt 176 receives enough AC voltage, the full-wave bridge rectifier 300 provides and outputs enough DC voltage such that the diode 304 biased by resistor 310 $R_{bias}$ conducts enough current to cause the switch 306 to change to an open or very high impedance state. Thus, the switching action of the shunt 176 makes nearly all available power from the AC power source 134 usable by the signaling device 168, when it is desired. The amount of diverted AC power from the AC power source 134 is above the threshold necessary to cause the signaling device 168 to emit a sound. Pressing the front button 148 of the doorbell 130 therefore causes the signaling device 168 to sound, alerting any person(s) within the structure to which the doorbell 130 is mounted that there is a visitor at the front door (or at another location corresponding to the location of the doorbell 130).

Figure 16:
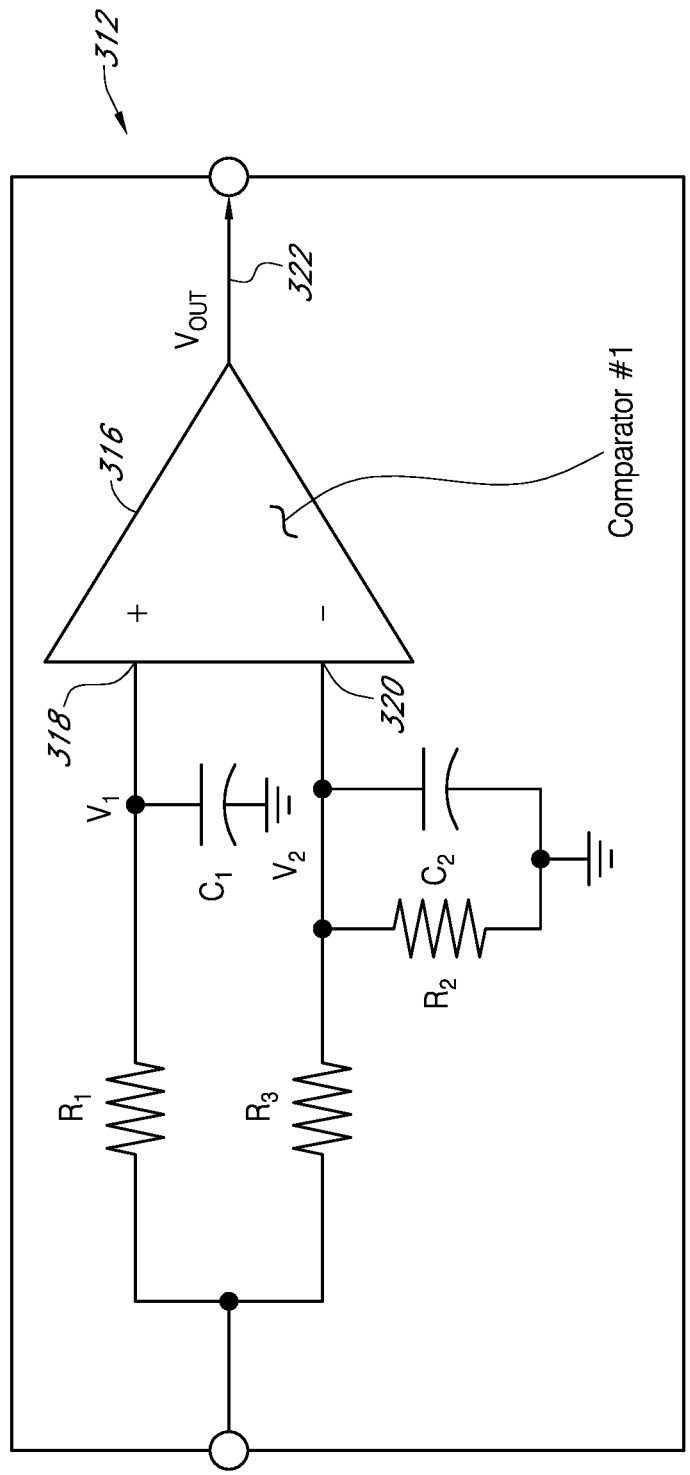
FIGS. 16 and 17 are circuit diagrams illustrating embodiments of first and second comparator circuits, respectively, of the shunt of FIG. 15.
Figure 17:
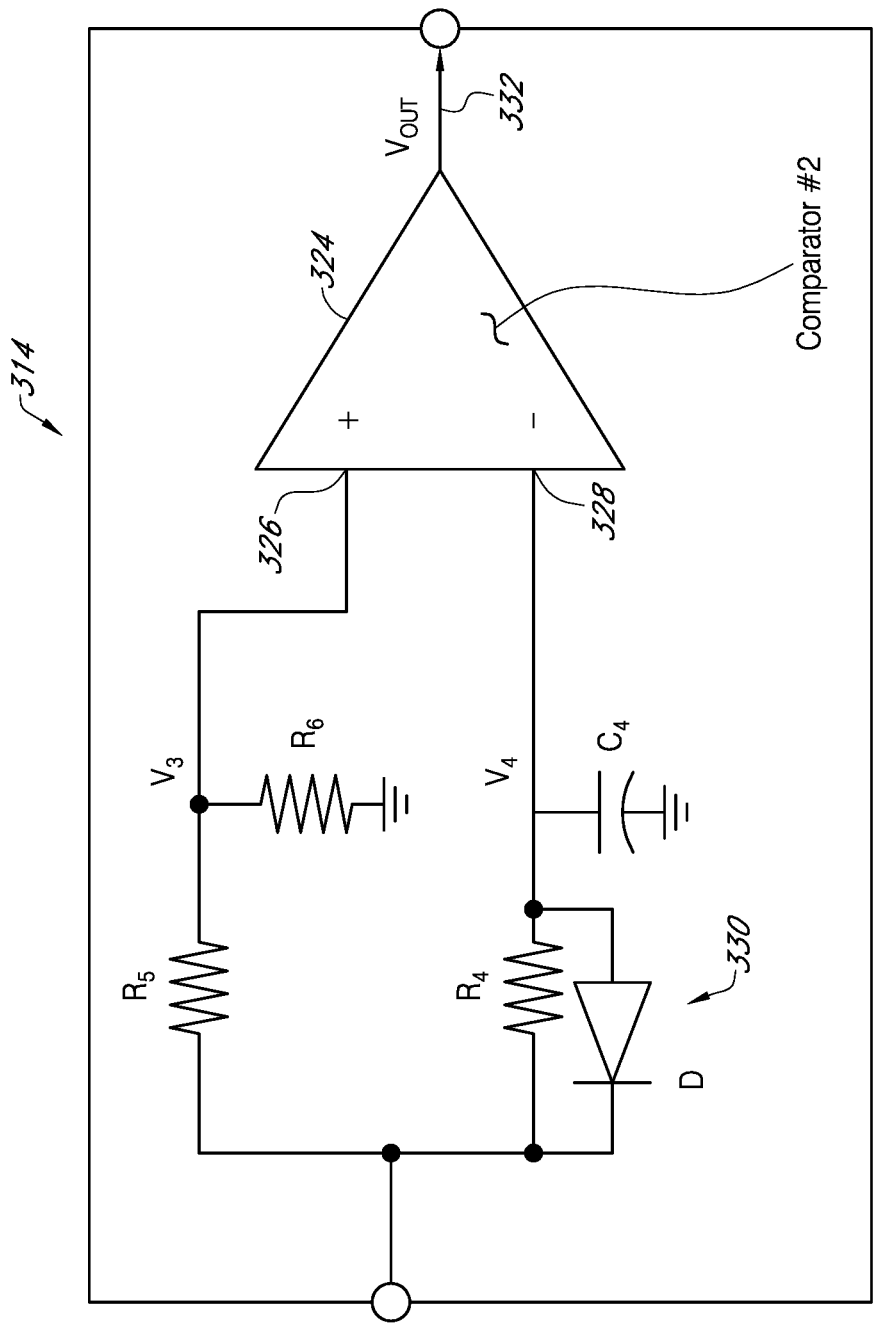

With continued reference to FIG. 15, the shunt 176 further comprises a first comparator circuit 312 and a second comparator circuit 314. FIGS. 16 and 17 are circuit diagrams illustrating example embodiments of the first and second comparator 324 circuits 312, 314, respectively, of the shunt 176 of FIG. 15. The comparators 312, 314 of FIGS. 16 and 17 are both open collector-type or open drain-type. These types of comparators are advantageous because they allow the outputs to be tied together without conflict, commonly known as a "wired-OR" connection. As further described below, the first comparator circuit 312 serves the purpose of returning the state of the shunt switch 306 to the normally closed, low impedance state, when an opening event is detected at the electronic switch 166 (FIG. 3). The second comparator circuit 314 serves as a time out safety trigger, returning the state of the shunt switch 306 to the normally closed, low impedance state, in the event that the first comparator circuit 312 fails to perform its intended function.

With reference to FIG. 16, the first comparator circuit 312 comprises a first comparator 316, and an RC network at each of its two inputs 318, 320. The first (positive) input 318 of the first comparator 316 has an RC network having time constant $Tau_1$, where $Tau_1=C_1*R_1$. The second (negative) input 320 of the first comparator 316 has a voltage divider $R_2/(R_2+R_3)$ and time constant $Tau_2$, where $Tau_2=C_2*((R_2*R_3)/((R_2+R_3)))$. With reference to FIGS. 18 and 19, which are waveform diagrams for the first comparator circuit 312 of FIG. 16, the first comparator circuit 312 behavior is as follows. At time $t_1$, when the $V_{DC}$ at the capacitor 302 (FIG. 15) ramps up due to closure of the electronic switch (FIG. 3), both inputs 318, 320 to the first comparator 316 rise, with $V_2$ rising slower and asymptotically approaching $V_{MAX}*(R_2/(R_2+R_3))$, while $V_1$ rises faster and approaches $V_{MAX}$. The ratio $R_2/(R_2+R_3)$ may be chosen based on noise level consideration, particularly to ensure a positive drive with margin into the first comparator 316, for all times when the electronic switch 166 is closed. This assures the output $V_{OUT}$ 322 of the first comparator 316 will be high impedance, since it is an open collector-type or an open drain-type output. Upon the electronic switch 166 opening at time $t_2$, the voltage $V_{DC}$ at the capacitor 302 drops, and the voltage $V_1$ drops below $V_2$. The first comparator 316 responds by driving its output $V_{OUT}$ 322 on, which pulls down the voltage and starts to turn off the diode 304 in the shunt switch 306. The shunt switch 306 responds by reverting back to its normally closed position.

Figures 20, 21:
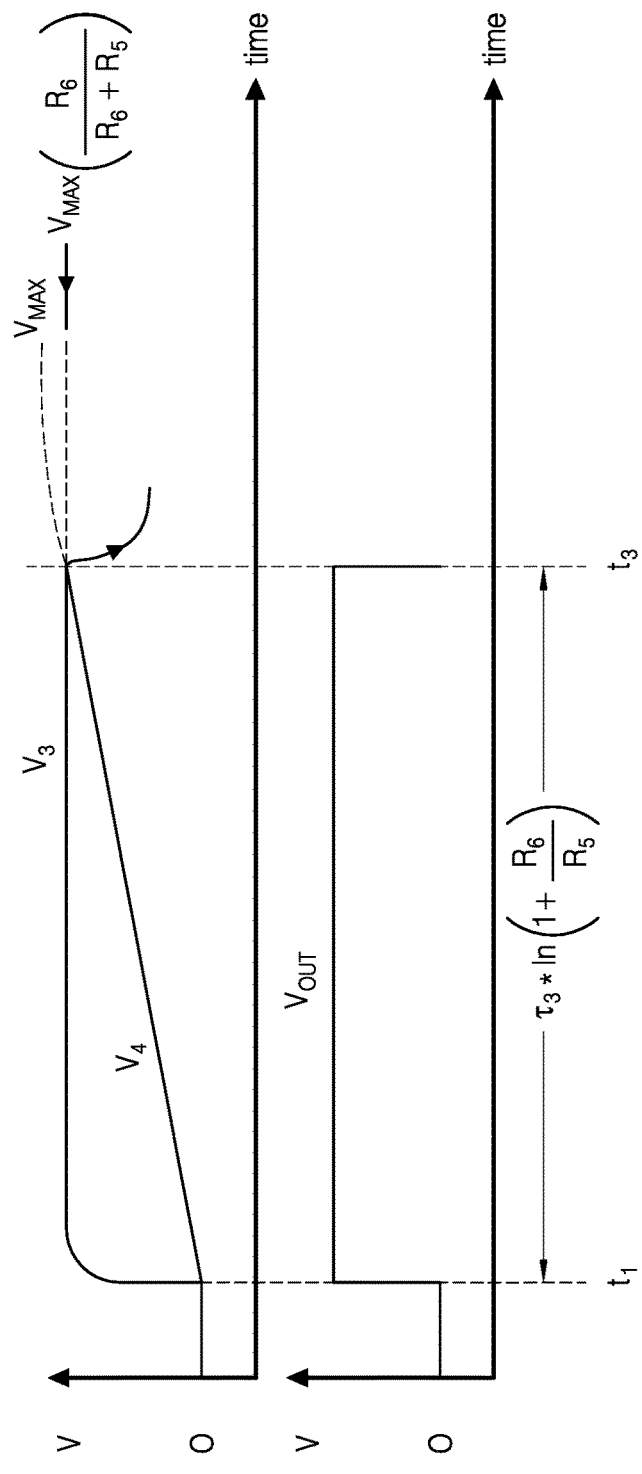
FIGS. 20 and 21 are waveform diagrams for the second comparator circuit of FIG. 17.

With reference to FIG. 17, the second comparator circuit 314 comprises a second comparator 324, and an RC network at each of its two inputs 326, 328, but with the addition of a diode 330 in one of the series branches. The first (positive) input 326 of the second comparator 324 receives an attenuated version of $V_{DC}$. More precisely, it receives a voltage given by $V_{DC}*(R_6/(R_6+R_5))$. In some embodiments, a capacitor (not shown) may be provided across $R_6$, as some filtering may be advantageous. The second (negative) input 328 of the second comparator 324 receives a voltage $V_4$ that rises slowly after $V_{DC}$ ramps up. With reference to FIGS. 20 and 21, which are waveform diagrams for the second comparator circuit 314 of FIG. 17, the second comparator circuit 314 behavior is as follows. The rising waveform is given by $V_4(t)=V_{DCMAX}*(1-\exp(-t/Tau_3))$ where $Tau_3=C_4*R_4$. While $V_4$ asymptotically approaches $V_{DCMAX}$, it will hit $V_{DCMAX}*(R_6/(R_6+R_5))$ at time $t_3$, which is given by $t_3=Tau_3*\ln(1+R_6/R_5)$. Because of delays in the feedback mechanism, the voltage $V_4$ will actually go higher than $V_3$, causing the output $V_{OUT}$ 332 of the second comparator 324 to be pulled low. This causes the diode 304 in the shunt switch 306 to discharge and turn off, which in turn causes the shunt switch 306 in $SW_1$ to revert to its normally closed position. The feedback mechanism is positive in that the turning off of the diode 304 puts the shunt 176 in a low impedance state, which causes the diode 304 to turn off even faster, since a low impedance state of the shunt 176 will collapse the $AC_1$, $AC_2$ terminals, if the electronic switch 166 is not closed. Reducing the voltage across $AC_1$, $AC_2$ will reduce the output of the full-wave bridge rectifier 300, $V_{DC}$.

Figure 22:
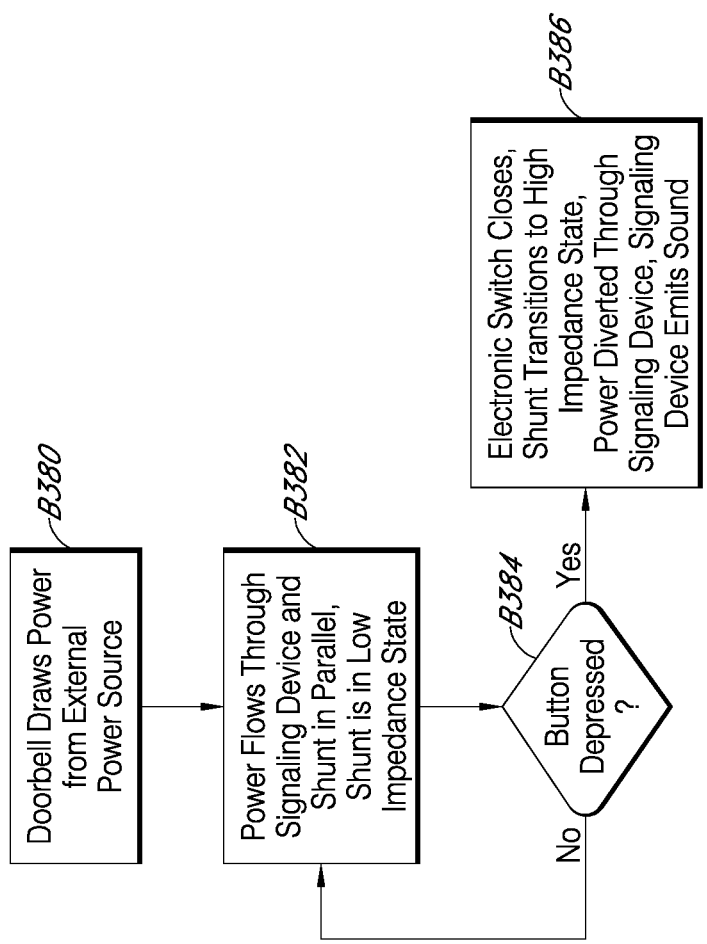
FIGS. 22 and 23 are flowcharts illustrating processes according to various aspects of the present disclosure.

FIG. 22 is a flowchart illustrating an embodiment of a process for sounding the signaling device 168 connected to the present A/V recording and communication doorbell 130 according to various aspects of the present disclosure. At block B380, the A/V recording and communication doorbell 130 draws power from an external power source. The external power source may be, for example, the AC power source 134, as shown in FIG. 3. At block B382, the power flows through the signaling device 168 and the shunt 176 in parallel, and the shunt 176 is in the low impedance state. At block B384, the process determines whether the front button 148 has been depressed. If the front button 148 has not been depressed, then the process returns to block B382. If, however, the front button 148 has been depressed, then the process moves to block B386. At block B386, the electronic switch 166 closes, thereby causing the shunt 176 to transition to the high impedance state, which in turn causes the power drawn from the external power source to be diverted through the signaling device 168, which in turn causes the signaling device 168 to emit a sound. Also, when the front button 148 is depressed, the speaker 152 of the A/V recording and communication doorbell 130 may emit a sound to alert any persons within earshot of the speaker 152 that a visitor has pressed the front button 148.

Figure 23:
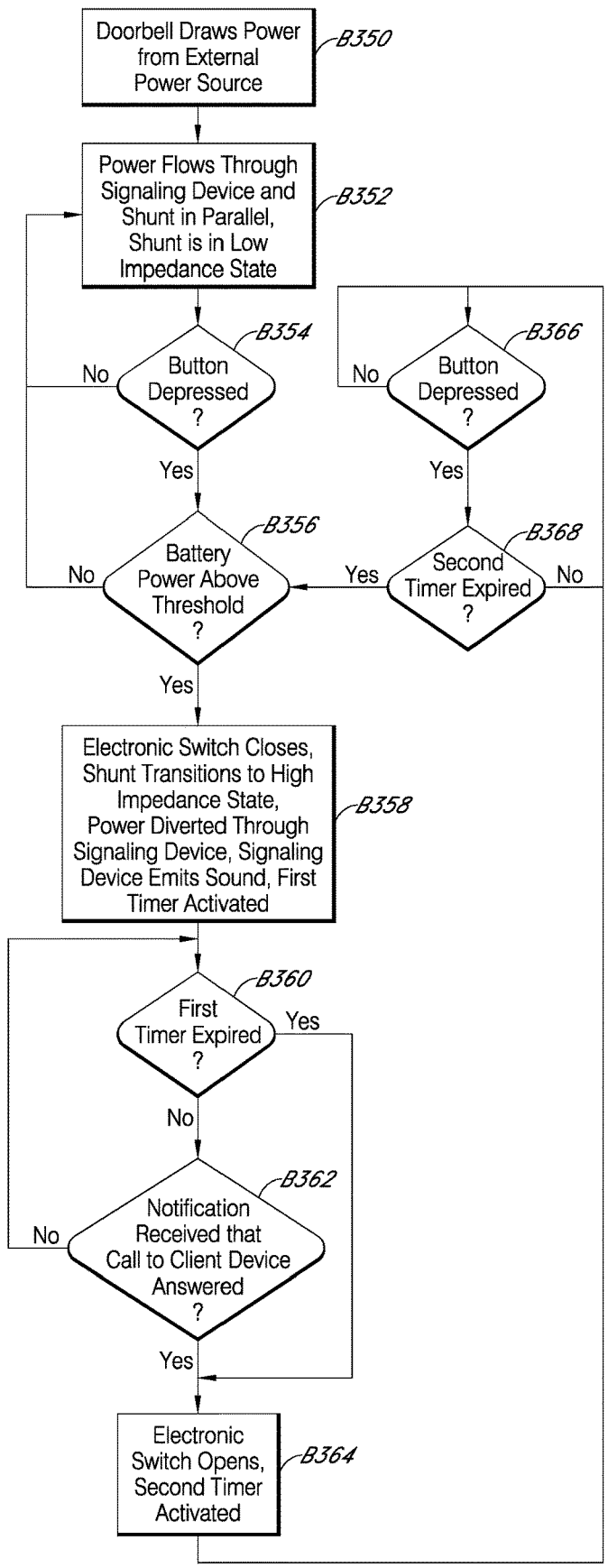

FIG. 23 is a flowchart illustrating another embodiment of a process for sounding the signaling device 168 connected to the present A/V recording and communication doorbell 130 according to various aspects of the present disclosure. At block B350, the A/V recording and communication doorbell 130 draws power from an external power source. The external power source may be, for example, the AC power source 134, as shown in FIG. 3. At block B352, the power flows through the signaling device 168 and the shunt 176 in parallel, and the shunt 176 is in the low impedance state. At block B354, the process determines whether the front button 148 has been depressed. If the front button 148 has not been depressed, then the process returns to block B352. If, however, the front button 148 has been depressed, then the process moves to block B356. Also, when the front button 148 is depressed, the speaker 152 of the A/V recording and communication doorbell 130 may emit a sound to alert any persons within earshot of the speaker 152 that a visitor has pressed the front button 148.

At block B356, the process determines whether the power in the battery 142 is above a threshold. This determination helps ensure that the battery 142 does not drain completely while the power manager 140 is drawing supplemental power from the battery 142. If the power in the battery 142 is not above the threshold, then the process returns to block B352. If, however, the power in the battery 142 is above the threshold, then the process moves to block B358. At block B358, the electronic switch 166 closes, thereby causing the shunt 176 to transition to the high impedance state, which in turn causes the power drawn from the external power source to be diverted through the signaling device 168, which in turn causes the signaling device 168 to emit a sound.

Also at block B358, a first timer is activated. The first timer, which may be implemented by the processor 160, for example, enables several advantages. For example, the first timer enhances the compatibility of the present A/V recording and communication doorbell 130 with different types of existing signaling devices 168. Many existing signaling devices are of two types: electro-mechanical and electronic. Electro-mechanical signaling devices typically include a pair of metal tubes (or plates) that are tuned to different notes and act as resonators when struck. A plunger strikes the tubes or plates in quick succession, creating the "ding-dong" sound that is characteristic of many traditional doorbells. Electronic signaling devices, by contrast, typically include an audio speaker that acts as an electro-acoustic transducer. The speaker can in many instances be made to play custom ringtones having different durations.

During initial setup of some embodiments of the present A/V recording and communication doorbell 130, the duration of the first timer may be set according to the type of signaling device 168 with which it is paired, and the duration of the first timer may be customizable. For example, if the doorbell 130 is paired with an electro-mechanical signaling device 168, then the first timer may be set to a relatively short duration, such as 250 ms. A short duration for the first timer enables the electro-mechanical signaling device 168 to emit the characteristic "ding-dong" sound, because the plunger of the signaling device 168 will strike a first one of the metal tubes (or plates) when the electronic switch 166 closes and strike the second one of the metal tubes (or plates) when the electronic switch 166 opens. If the doorbell 130 is paired with an electro-mechanical signaling device 168, the duration of the first timer may be preset (not customizable by the user). If, however, the doorbell 130 is paired with an electronic signaling device 168, then the first timer may be set to a relatively long duration, such as from 1 second to 10 seconds, and the duration of the first timer may be selectable by the user. For example, if the user's electronic signaling device 168 plays a ringtone having a duration of about 3 seconds, then the user may set the duration of the first timer to be about 3 seconds.

During initial setup of some embodiments of the present A/V recording and communication doorbell 130, the user may be prompted to indicate what type of signaling device 168 the doorbell 130 is to be paired with. If the user indicates that the signaling device 168 is electro-mechanical, then the process may automatically set the duration of the first timer to a relatively short duration. If, however, the user indicates that the signaling device 168 is electronic, then the process may prompt the user to enter a desired duration for the first timer. In some embodiments, the process may prompt the user that the duration must be within a preset range.

At block B360, the process determines whether the first timer has expired. If the first timer has expired, then the process moves to block B364, which is described below. If, however, the first timer has not expired, then the process moves to block B362. At block B362, the process determines whether a notification has been received that a call to the user's client device has been answered. If no notification has been received that a call to the user's client device has been answered, then the process returns to block B360. If, however, a notification has been received that a call to the user's client device has been answered, then the process moves to block B364. At block B364, the electronic switch 166 opens, and a second timer is activated. The second timer, which may be implemented by the processor 160, for example, prevents a subsequent press of the front button 148 from closing the electronic switch 166, thereby preventing the visitor from repeatedly sounding the signaling device 168 (by rapidly pressing and re-pressing the front button 148). The second timer also allows time for the battery 142 to recharge. The process then moves to block B366. At block B366, the process determines whether the front button 148 has been depressed. If the front button 148 has not been depressed, then the process returns to block B366. If, however, the front button 148 has been depressed, then the process moves to block B368. At block B368, the process determines whether the second timer has expired. If the second timer has not expired, then the process returns to block B366. If, however, the second timer has expired, then the process returns to block B356.

In some embodiments, the present A/V recording and communication doorbell 130 may detect a visitor (by detecting motion) before the visitor presses the front button 148. In such cases, the A/V recording and communication doorbell 130 may initiate a call to the user's client device in a manner similar to that described above with respect to blocks B202-B210 of FIG. 2. If the user answers the call on his or her client device before the visitor presses the front button 148 of the A/V recording and communication doorbell 130, then the front button 148 may be blocked out as long as the call between the visitor and the user is still in progress. That is, if the visitor presses the front button 148 while the call between the visitor and the user is in progress, the electronic switch 166 may be prevented from closing. If, however, the visitor presses the front button 148 of the A/V recording and communication doorbell 130 before the user answers the call on his or her client device, then the process may proceed according to that described above with respect to FIG. 23 (beginning at block B354).

Figure 24:
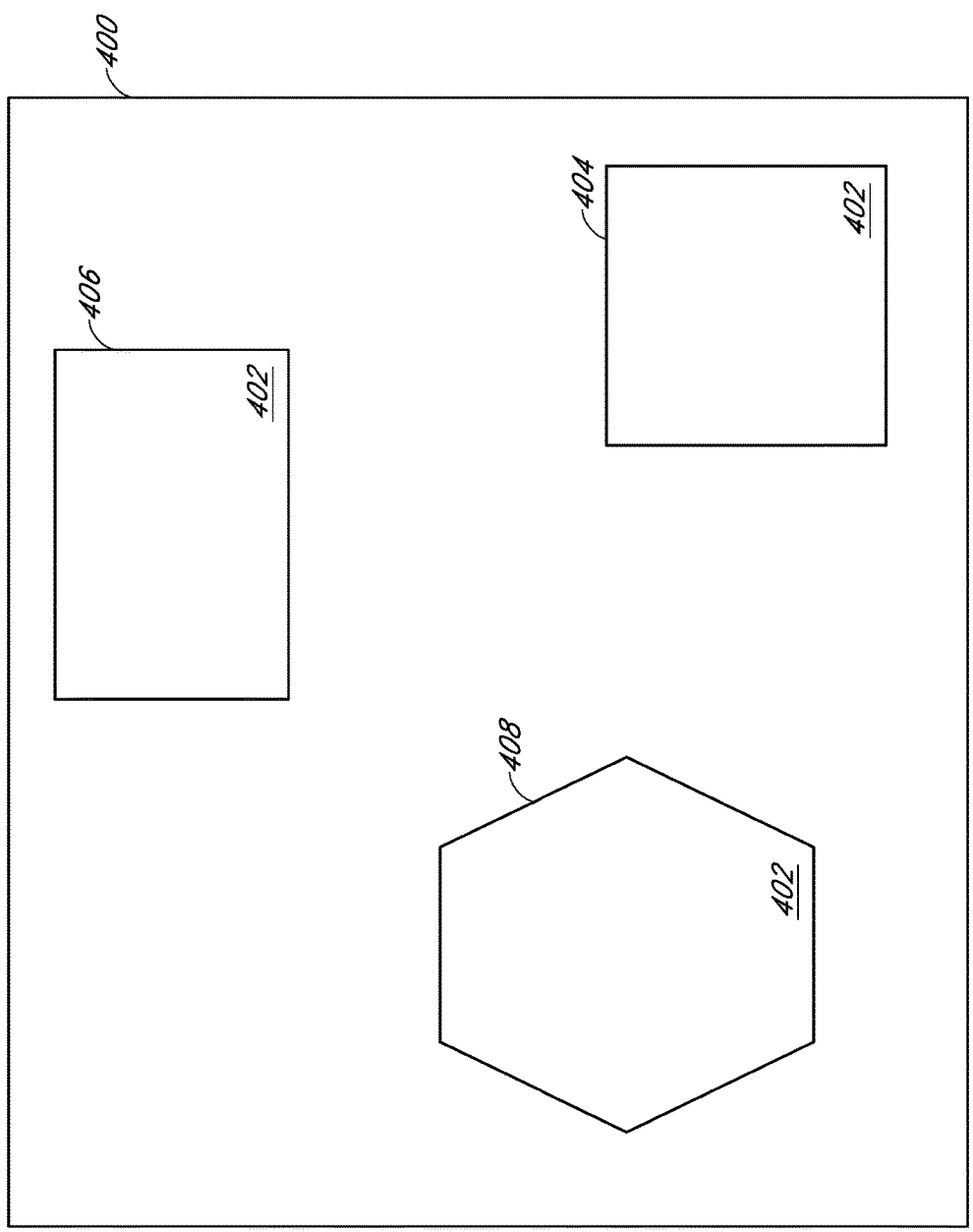
FIG. 24 is a schematic diagram of a technique for creating intrusion zones according to various aspects of the present disclosure.
Figure 32:
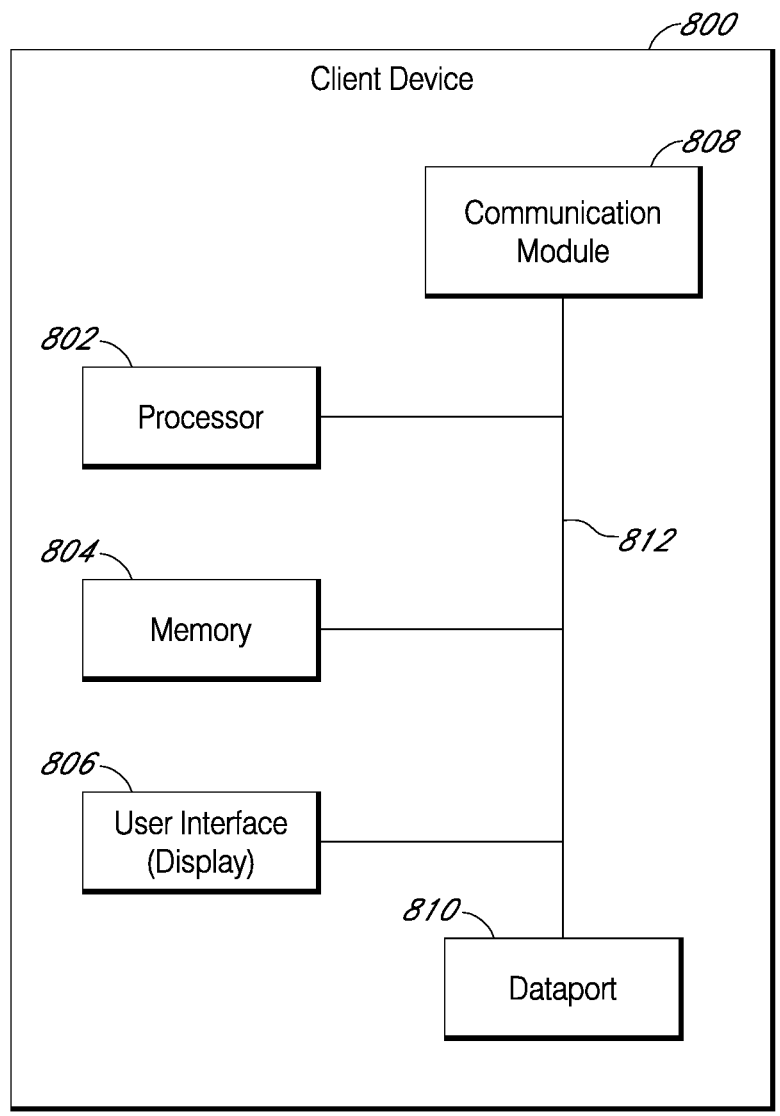
FIG. 32 is a functional block diagram of a client device on which the present embodiments may be implemented according to various aspects of the present disclosure.

Some of the present embodiments provide advantageous motion detection algorithms and techniques. For example, during an initial setup process, or at any time after the A/V recording and communication doorbell 130 has been setup, the user may designate one or more zones within the field of view 400 of the camera 154 as motion zones of interest, also referred to as "intrusion zones." With reference to FIG. 24, when configuring the camera 154's motion detection, a configuration process may present the user with a visual representation of the field of view 400 of the camera 154. For example, an application executing on the user's client device 800, such as a smartphone, may show a live view from the camera 154 of the user's A/V recording and communication doorbell 130 on the display 806 of the user's client device 800 (FIG. 32). The configuration process may prompt the user to designate one or more intrusion zones 402 by selecting areas on the display 806 of the user's client device 800. For example, the user may draw one or more polygons 404, 406, 408 on the display 806 to designate the intrusion zone(s) 402. If the display 806 of the user's client device 800 is a touchscreen, the user may designate the intrusion zone(s) 402 by tracing the polygon(s) 404, 406, 408 on the display 806 with his or her finger. The configuration process may enable the user to designate intrusion zone(s) 402 having any shape and/or number of sides. For example, the intrusion zone(s) 402 may be regular polygons such as the square 404, rectangle 406, and hexagon 408 shown in FIG. 24, or any other type of regular polygon such as circles, pentagons, octagons, decagons, etc., or any type of irregular polygons. The configuration process may allow the user to designate any number of intrusion zones 402, such as one intrusion zone 402, two intrusion zones 402, three intrusion zones 402, etc. When all desired intrusion zones 402 have been created, the configuration process may prompt the user to save the intrusion zones 402, after which the created intrusion zones 402 may be sent from the user's client device 800 to a device in the network, such as a server 900C (FIG. 33), and to the user's A/V recording and communication doorbell 130 via the user's network 110 (FIG. 1).

After one or more intrusion zones 402 have been designated, embodiments of the present motion detection algorithms and techniques may incorporate those intrusion zones 402. For example, the camera 154, which may be powered on at all times, may continuously monitor motion within the field of view 400. The A/V recording and communication doorbell 130, however, may not begin recording and/or streaming video to the user's client device 800 unless and until a moving object enters one of the intrusion zones 402. The recording and/or streaming may continue until the moving object exits the intrusion zone 402 it earlier entered. Further, if the moving object stops moving, but remains in the intrusion zone 402, the recording and/or streaming may continue while the object remains stationary within the intrusion zone 402. This aspect of the present embodiments creates an advantage over systems that rely on other types of motion sensors, such as passive IR sensors, that typically only detect moving objects, and therefore do not typically record and/or stream stationary objects. The object may, of course, be a person.

Some of the present embodiments may incorporate motion detection algorithms and techniques that vary according to the level of ambient light. Generally, the quality of video recorded during daylight hours is good enough to detect moving objects of interest while correctly filtering out other unnecessary and unwanted moving objects (e.g. tree branches or flags swaying in the wind, sun glare, etc.). At night, however, the A/V recording and communication doorbell 130 turns on the IR light source 156 to increase the incoming light intensity. However, the light intensity level can be affected by other light sources, such as porchlights, outdoor security lights, streetlights, and headlights of passing cars. These light sources are preferably filtered out in order to reduce false positives (also referred to as false alarms). Thus, to accurately detect moving objects of interest while correctly filtering out other unnecessary and unwanted moving objects, embodiments of the present A/V recording and communication doorbell 130 may use different motion detection algorithms during the day versus at night.

For example, as discussed above, the A/V recording and communication doorbell 130 may not begin recording and/or streaming video to the user's client device 800 unless and until a moving object enters one of the intrusion zones 402. During periods of low levels of ambient light, however, such as after nightfall, the A/V recording and communication doorbell 130 may not begin recording and/or streaming video to the user's client device 800 unless and until the moving object that enters one of the intrusion zones 402 is a human. In some of the present embodiments, a process for determining whether a moving object is a human compares characteristics of the motion of the moving object with a dataset. For example, in each frame, the A/V recording and communication doorbell 130 may detect object regions, extract features from those object regions, and then compare those features with trained features in the dataset. If a comparison score and a confidence level are above a predefined threshold, then the algorithm returns a positive output (e.g. human) on the detected object region. Thus, for example, during daylight hours the A/V recording and communication doorbell 130 may begin recording and/or streaming video to the user's client device 800 as soon as any moving object enters one of the intrusion zones 402, but during nighttime hours the A/V recording and communication doorbell 130 may begin recording and/or streaming video to the user's client device 800 only if the moving object that entered one of the intrusion zones 402 is a human.

Differentiating between moving humans and moving non-human objects during nighttime hours may help to reduce false positives, because nighttime motion detection can be affected by uneven lighting conditions. For example, at night an A/V recording and communication doorbell may interpret a sudden change in ambient light, such as a porchlight being turned on, as motion. These kinds of false positives are reduced in the present embodiments by limiting recording and/or streaming video to the user's client device 800 to those instances when a detected object in an intrusion zone 402 is a human.

One example embodiment of a technique for determining whether a detected object in an intrusion zone 402 is a human is tracking moving objects by tracking the center of mass of each object, and predicting the trajectory of the object based on the observed motion of the center of mass. In some embodiments, the center of mass for an arbitrary shape of a detected region may be calculated as an average of multiple small centroid regions. With a finite number of small centroids, the total centroid can be calculated as:

The centroid of a finite set of k points $x_1, x_2, \ldots x_k$, in $R_n$ is $$C=(x_1+x_2+ \ldots +x_k)/k$$

Tracking moving objects by tracking the center of mass of each object, and predicting the trajectory of the object based on the observed motion of the center of mass, can advantageously reduce false positives. For example, a person moving through the camera 154's field of view 400 typically follows a predictable trajectory. If the person is moving in a first direction at a given instant, the person is likely to be moving in that same direction in the next instant. By contrast, many objects that move within the camera 154's field of view 400 follow very unpredictable trajectories. For example, a tree branch swaying in the breeze follows a somewhat random trajectory that depends upon which way the wind is blowing at any given moment. Thus, by attempting to predict the trajectory of the center of mass of an object moving through the camera 154's field of view 400, and then determining whether the object actually follows the predicted trajectory, the present embodiments can make an educated guess as to whether an object being tracked is an object of interest, such as a person, or another object, such as a tree branch. With this trajectory analysis, embodiments of the present A/V recording and communication doorbell 130 can successfully distinguish objects of interest from false positives by combining the trajectory analysis with detection of other changes in each frame.

Some of the present embodiments provide advantageous night vision algorithms and techniques for determining when to activate night vision mode and when to deactivate night vision mode. When night vision mode is activated, the IR light source 156 may be illuminated (turned on), the IR cut filter 158 may be turned off, and the camera 154 may transition from color mode to grayscale mode. Conversely, when night vision mode is deactivated, the IR light source 156 may be turned off, the IR cut filter 158 may be turned on, and the camera 154 may transition from grayscale mode to color mode.

In one example technique, some embodiments of the present night vision algorithms may measure the average luminance of the pixels and the average standard deviation of the pixels in each frame of video shot by the camera 154. The average luminance and the average standard deviation may then be tracked across frames by keeping a running average of each value. If the running averages of both values fall below a first pair of threshold values, then the A/V recording and communication doorbell 130 may activate night vision mode. Conversely, if the running averages of both values rise above a second pair of threshold values, then the A/V recording and communication doorbell 130 may deactivate night vision mode. For example, if the running average of the average luminance (AL) falls below a first threshold value (AL1), and the running average of the average standard deviation (ASD) falls below a first threshold value (ASD1), then the A/V recording and communication doorbell 130 may activate night vision mode. Conversely, if the running average of the average luminance (AL) rises above a second threshold value (AL2), and the running average of the average standard deviation (ASD) rises above a second threshold value (ASD2), then the A/V recording and communication doorbell 130 may deactivate night vision mode. Using separate threshold values for activating night vision mode versus deactivating night vision mode helps to prevent the A/V recording and communication doorbell 130 from oscillating between night vision mode and non-night vision mode during periods of fading light, such as dusk, and periods of rising light, such as dawn.

In some embodiments, sudden changes in light conditions may be ignored when tracking the running averages of the average luminance (AL) and the average standard deviation (ASD). For example, when night vision mode is active (e.g. after nightfall), if a porchlight is turned on near the A/V recording and communication doorbell 130 the average luminance and the average standard deviation in the pixels will suddenly spike. But, it is still after nightfall and the porchlight may soon be turned off, so it may be advantageous to keep night vision mode active. Some of the present embodiments, therefore, may not factor these sudden changes in the values AL and ASD into the running averages for those values.

In some embodiments, the proximity of the A/V recording and communication doorbell 130 to large objects or structures may affect whether night vision mode is activated or deactivated. For example, if the A/V recording and communication doorbell 130 is located directly across from a wall of a structure, a large percentage of the IR light generated by the IR light source 156 may be reflected back toward the camera 154. This reflected IR light could cause the A/V recording and communication doorbell 130 to deactivate night vision mode even under conditions of low ambient light, because the IR light reflected into the camera 154 increases the average light intensity value. A conventional night vision algorithm based on frame intensity level would cause night vision mode to be deactivates even when the current ambient light level was low. Thus, some of the present embodiments may compensate for this situation by measuring how many pixels in the field of view 400 of the camera 154 are saturated. Then, by comparing the number of saturated pixels to a threshold value, the process can determine whether to maintain the A/V recording and communication doorbell 130 in night vision mode. For example, if night vision mode is active, and the number of saturated pixels is above the threshold value, then night vision mode may remain active even when the values of AL and ASD rise above the second pair of threshold values (AL2, ASD2).

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

As discussed above, another aspect of the present embodiments includes the realization that, in current A/V recording and communication doorbell systems other than the present embodiments, using the camera alone for detecting motion may have drawbacks under certain circumstances. For example, during nighttime hours the level of ambient light about the doorbell may be low. Since the camera detects motion by comparing successive video frames, if there is inadequate light to illuminate the field of view of the camera, then the camera may be unable to detect changes in successive video frames. Providing an illumination source, such as infrared LEDs, during nighttime hours may compensate for this issue. However, infrared LEDs may have range limitations. For example, infrared LEDs may not be well suited for illuminating the camera's field of view beyond a certain distance, such as about fifteen feet. The present embodiments solve this problem by providing a motion sensor in addition to the camera. For example, in some of the present embodiments the motion sensor may comprise one or more passive infrared (PIR) sensors. PIR sensors detect changes in the amount of IR radiation impinging upon them, which varies depending on the temperature and/or surface characteristics of the object(s) in front of the sensors. PIR sensors are thus effective at detecting motion even under low light conditions, particularly motion of persons and other objects that generate heat. Further, the PIR sensors may be effective at detecting objects at great distances from the camera, such as thirty feet or more. The PIR sensors thus may provide increased range as compared to infrared LEDs. In some of the present embodiments, therefore, the PIR sensor(s) enhance the motion detecting capabilities of the doorbell, particularly when there is a low level of ambient light about the doorbell. In some embodiments, one or more of the PIR sensor(s) may comprise a pyroelectric infrared sensor.

Figure 25:
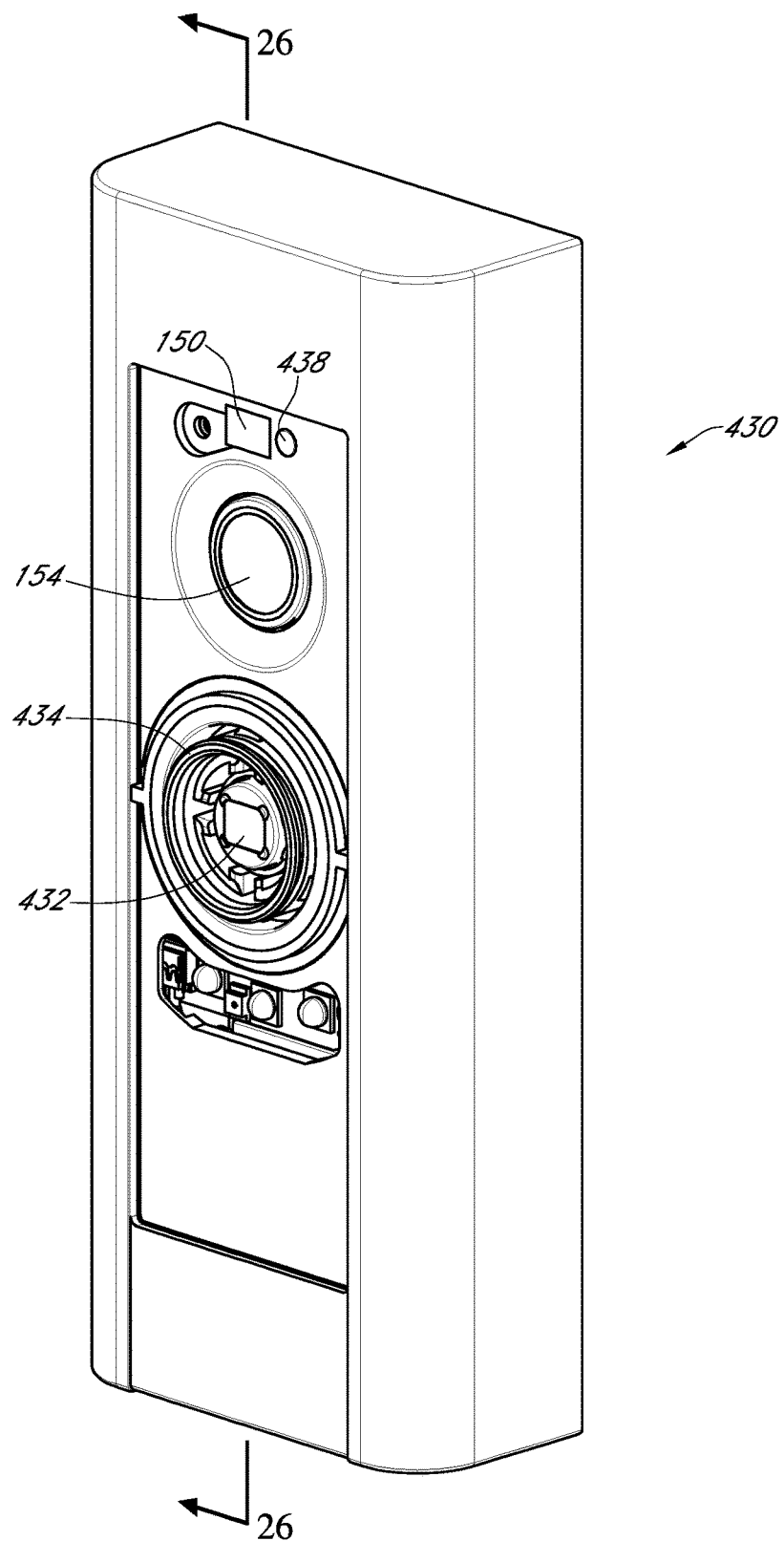
FIG. 25 is a front perspective view of another embodiment of an A/V recording and communication doorbell according to the present disclosure.
Figure 26:
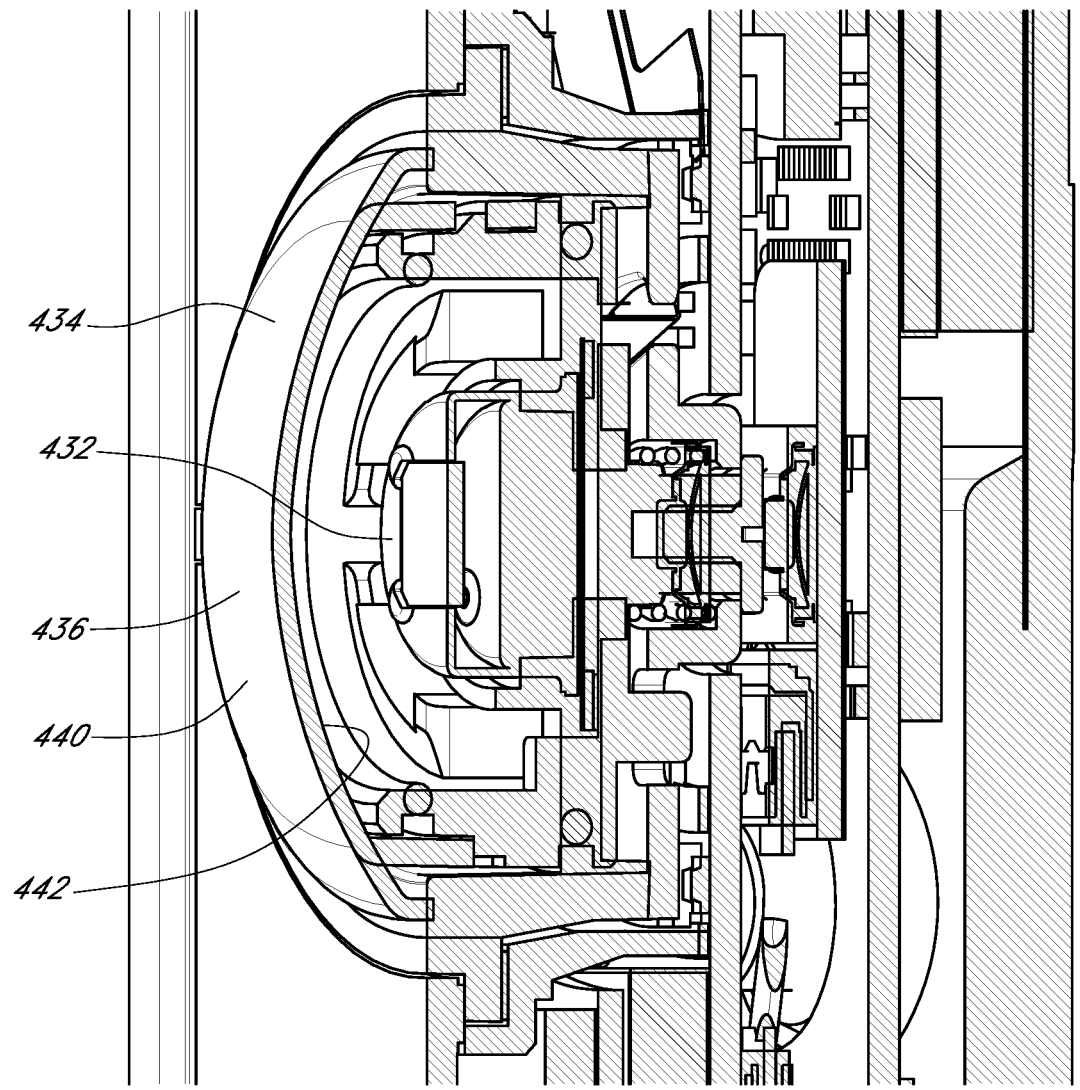
FIG. 26 is a right-side perspective, cross-sectional, detail view of the A/V recording and communication doorbell of FIG. 25 taken through the line 26-26 in FIG. 25.
Figure 27:
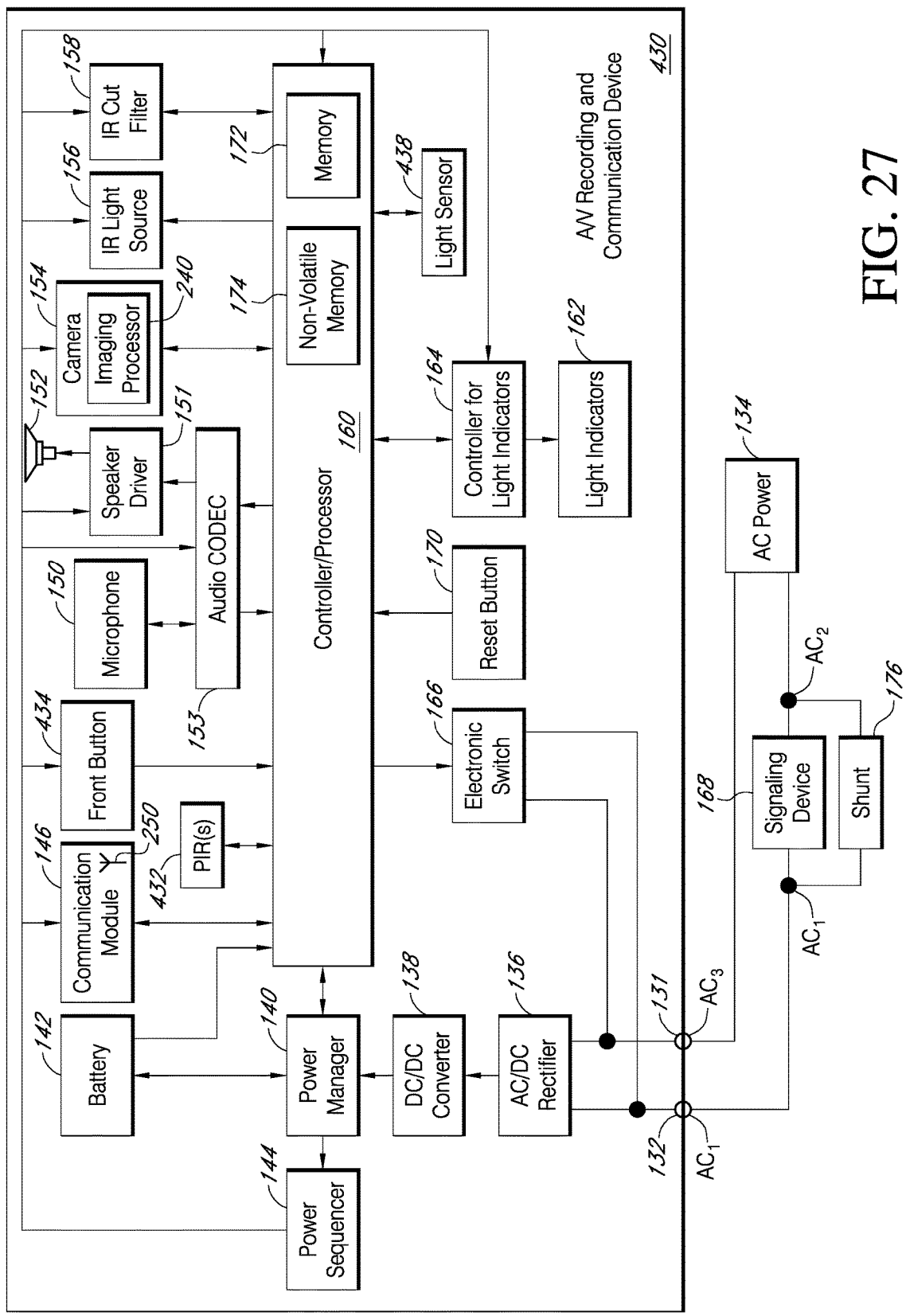
FIG. 27 is a functional block diagram illustrating another embodiment of an A/V recording and communication doorbell system according to the present disclosure.

FIGS. 25-27 illustrate another embodiment of an A/V recording and communication doorbell 430 according to the present disclosure. The doorbell 430 includes many of the same components and much of the same functionality as the doorbell 130 shown in FIGS. 3-24. Thus, for simplicity, components that are common to both doorbells 130, 430 will be labeled with the same reference numbers in the figures.

With reference to FIG. 25, the doorbell 430 includes a PIR sensor 432 integrated within the front button 434. Generally, a PIR sensor detects changes in the amount of infrared radiation impinging upon it, which varies depending on the temperature and/or surface characteristics of the object(s) in front of the sensor. When an object, such as a person, passes in front of the sensor, the temperature at that point in the sensor's field of view rises from ambient temperature to body temperature. The PIR sensor converts the resulting change in the incoming infrared radiation into a change in an output signal (e.g., a voltage), which triggers the detection. Objects of similar temperature but different surface characteristics may also have a different infrared emission pattern, and thus moving them with respect to the background may trigger the PIR sensor as well. In various embodiments, the PIR sensor 432 may be any type of sensor capable of detecting and communicating the presence of a heat source within its field of view. Further, alternative embodiments may comprise one or more motion sensors either in place of or in addition to the PIR sensor 432. Such alternative motion sensors may be configured to detect motion using any methodology, such as a methodology that does not rely on detecting the presence of a heat source within a field of view.

With reference to FIG. 26, the PIR sensor 432 is located behind a front cover 436 of the front button 434. The front cover 436 preferably comprises a material that is substantially transparent to infrared radiation so that it does not interfere with the operation of the PIR sensor 432. For example, in some embodiments the material of the front cover 436 may comprise one or more plastic materials, such as polycarbonate, ABS, or polyethylene. With reference to FIG. 27, the PIR(s) 432 is/are operatively connected to the processor 160. When the PIR sensor 432 detects a change in the incoming infrared radiation, it produces an output signal (e.g., a voltage) to the processor 160, which indicates to the processor 160 that motion is present in the field of view of the PIR sensor 432.

In the illustrated embodiment, only one PIR sensor 432 is provided, but in alternative embodiments any number of PIR sensors 432 may be provided. Further, in the illustrated embodiment the PIR sensor 432 is integrated within the front button 434, but in alternative embodiments the PIR sensor 432(*s*) may be located in another area of the doorbell 430 away from the front button 434. Nevertheless, locating the PIR sensor 432 within the front button 434 provides advantages. For example, locating the PIR sensor 432 within the front button 434 leverages available space within the outer envelope of the doorbell 430 so that the size of the doorbell 430 does not need to be increased in order to accommodate the PIR sensor 432. Further, in some embodiments, the front cover 436 of the front button 434 may comprise a Fresnel lens. For example, an outer surface 440 of the front cover 436 may be substantially smooth and curved (e.g., spherically curved) and an inner surface 442 of the front cover 436 may include a plurality of ridges. The Fresnel lens is thus configured to focus incoming light (including infrared radiation) passing through the front cover 436 onto the PIR sensor 432, thereby increasing the sensitivity and/or detection range of the PIR sensor 432. Locating the PIR sensor 432 within the front button 434 thus provides the further advantage that the front cover 436 may comprise a Fresnel lens that increases the sensitivity and/or detection range of the PIR sensor 432. In some embodiments, the PIR sensor 432 may be capable of detecting objects that are thirty feet away or more from the A/V recording and communication doorbell 430, which may be a longer range than the camera 154 can achieve under nighttime or low light conditions when the field of view is illuminated by the IR light source 156.

The A/V recording and communication doorbell 430 of FIGS. 25-27, which includes both the camera 154 and the PIR sensor 432, may use both the camera 154 and the PIR sensor 432 for motion detection. This functionality provides advantages because the capabilities of the camera 154 and the PIR sensor 432 are in some ways complementary to one another, such that each component 154, 432 may compensate for one or more shortcomings of the other component 154, 432, as described below.

For example, some advantages of the PIR sensor 432 include: Speed—object movements very quickly result in an output signal from the PIR sensor 432; Long range—objects can be detected from 30 feet away or more; and good nighttime sensing capability—no need for the field of view to be illuminated. In contrast, some disadvantages of the PIR sensor 432 include: False alarms created by unwanted moving objects; and no information provided about the object that caused the motion detection (e.g., no information about the object's size, location within the field of view, or distance from the PIR sensor 432).

Some advantages of the camera 154, in its capacity for detecting motion, include: Accuracy—there is much more information available on an image domain than there is in a temperature change (which is what the PIR sensor 432 detects); Location specific—can be used to determine the location of an object within the field of view, which facilitates the creation of custom motion detection zones; and enables object classification—provides very reliable classification for the type of object (e.g., person, small animal, vehicle, etc.) within the field of view. In contrast, some disadvantages of the camera 154 include: Ambient lighting limitations—heavily dependent on the lighting conditions; and slow—requires time to analyze object in successive images before determining whether motion is present.

The present embodiments, by combining the functionalities of the camera 154 and the PIR sensor 432, achieve numerous advantages. For example, the camera 154 and the PIR sensor 432 may compensate for each other's daytime and nighttime performance. During daytime hours (e.g., when there is a high level of ambient light), the camera 154 provides more reliable motion detection than the PIR sensor 432, while during nighttime hours (e.g., when there is a low level of ambient light), the PIR sensor 432 provides more reliable motion detection than the camera 154. Thus, in some embodiments, the camera 154 alone may be used for motion detection when there is a high level of ambient light, and the PIR sensor 432 alone may be used for motion detection when there is a low level of ambient light. The level of ambient light may be detected or measured using the camera 154 and/or a light sensor (described below with reference to FIG. 27), and the detected/measured level of ambient light may be compared to one or more threshold values in order to determine if the level of ambient light is high or low.

In further embodiments, the camera 154 and the PIR sensor 432 may be used in tandem for motion detection, with a first one of the components 154, 432 detecting motion and the other one of the components 154, 432 independently verifying the motion detection before an alert is sent to the user's client device 114. For example, if the PIR sensor 432 triggers a motion detection, the camera 154 may independently verify the detection before an alert is sent to the user's client device 114, and if the camera 154 triggers a motion detection, the PIR sensor 432 may independently verify the detection before an alert is sent to the user's client device 114. In this way, "false alarm" motion detections are reduced or eliminated and the reliability of the motion detection process is increased through an independent verification process. The independent verification process may be particularly advantageous during daytime hours, when the camera 154, which is more reliable for motion detection under bright light conditions, may be used to independently verify motion detections by the PIR sensor 432, and during nighttime hours, when the PIR sensor 432, which is more reliable for motion detection under low light conditions, may be used to independently verify motion detections by the camera 154. Further, during nighttime hours, the PIR sensor 432 may trigger a motion detection, the camera 154 may independently verify the motion detection, and, while the camera 154 is analyzing video frames to verify the motion detection, the PIR sensor 432 may validate continuous motion within the field of view.

Additional advantages that may be achieved by combining the functionalities of the camera 154 and the PIR sensor 432 in the present embodiments include, but are not limited to, the greater motion detection range of the PIR sensor 432 (e.g., 30 feet or more) as compared to the camera 154, and the PIR sensor 432 can facilitate continuous sensor data reading and analyzing.

As discussed above, yet another aspect of the present embodiments includes the realization that, in current A/V recording and communication doorbell systems other than the present embodiments, under nighttime or low ambient light conditions reflected infrared light can confuse the camera as to the actual light intensity in the camera's field of view. For example, if the doorbell is located opposite a wall or other structure that reflects a significant amount of the infrared light from the infrared light source, the image seen by the camera may appear to be very bright, which may confuse the camera as to the actual light intensity level in the field of view. The present embodiments solve this problem by providing a light sensor 438 (FIG. 25) in addition to the camera 154. The light sensor 438 may be configured to detect light in both the infrared and visible spectrums, and to provide information to the processor 160 about the intensity of light in these spectrums in the camera 154's field of view. The A/V recording and communication doorbell 430 is thus able to accurately detect the actual light intensity in the camera 154's field of view so that the doorbell 430's night vision functionality can be activated when needed, and deactivated when not needed.

With reference to FIG. 25, the light sensor 438 may be located next to the microphone 150, above the camera 154, and behind the upper portion 214 of the shield 192 (FIG. 4), although the illustrated location for the light sensor 438 is just one non-limiting example. The light sensor 438, which is operatively connected to the processor 160 (FIG. 27), may detect the level of ambient light, and the processor 160 may use the detected level of ambient light to determine when to activate the camera 154's night vision functionality. For example, the light sensor 438 may detect the level of ambient light, and the processor 160 may use the detected level of ambient light to control the current state of the IR cut filter 158 and to turn the IR light source 156 on and off. In some embodiments, the light sensor 438 alone may be used to detect the level of ambient light, while in other embodiments the camera 154 and the light sensor 438 may work in tandem to detect the level of ambient light.

With reference to FIG. 27, in some embodiments of the A/V recording and communication doorbell, the power manager 140 may further comprise a charge monitor (not shown) that monitors the level of charge in the rechargeable battery 142. When the charge monitor indicates that the level of charge in the rechargeable battery 142 is low, such as below a preset threshold, the power manager 140 may direct incoming power from the DC/DC converter 138 to the rechargeable battery 142 in order to recharge the rechargeable battery 142.

As discussed above, one aspect of the present embodiments includes the realization that, in current A/V recording and communication devices, such as doorbell systems, other than the present embodiments, even if motion detection is falsely triggered, or if an object that caused motion detection is no longer within the field of view, the A/V recording and communication device may unnecessarily continue to record and/or stream video footage. Conversely, the A/V recording and communication device may cease recording and/or streaming video footage even when the object is still within the field of view. Some of the present embodiments solve these problems by tracking an object and streaming video footage for only about as long as the object that caused motion detection remains within the field of view. In addition, the present embodiments may use a timer to determine when to end streaming and/or to customize the length of time between when an object is no longer detected and when streaming is ended. The present A/V recording and communication devices may thus improve streaming video and reduce unwanted notifications to a client device.

Still another aspect of the present embodiments includes the realization that, in current A/V recording and communication devices, such as doorbell systems, other than the present embodiments, false positive motion detections can sometimes occur. Some of the present embodiments solve this problem by leveraging the functionalities and advantages of the camera and the motion sensor so that these separate devices can be used to check one another. For example, if the camera detects motion, then recording and/or streaming may not begin until the motion sensor confirms that the motion detection by the camera was valid. Conversely, if the motion sensor detects motion, then recording and/or streaming may not begin until the camera confirms that the motion detection by the motion sensor was valid. If the second device cannot confirm a valid motion detection, then recording and/or streaming will not occur and the user will not receive a false positive motion alert.

Figure 28:
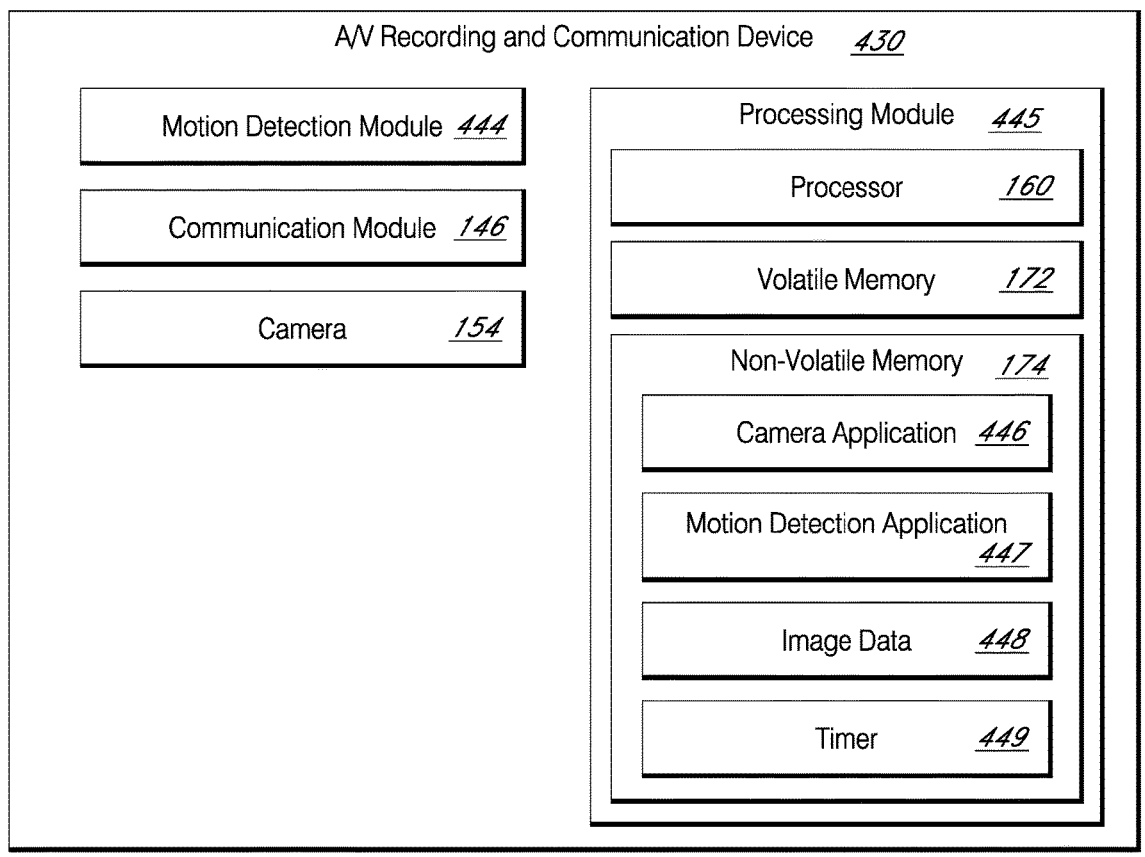
FIG. 28 is a functional block diagram illustrating several aspects of the A/V recording and communication doorbell of FIG. 27.

FIG. 28 is a functional block diagram illustrating several aspects of the A/V recording and communication device 430 of FIG. 27. With reference to FIG. 28, the A/V recording and communication device 430 may include a communication module 146 and a camera 154 as discussed above. The A/V recording and communication device 430 may also include a motion detection module 444 and a processing module 445 operatively connected to the motion detection module 444, the communication module 146, and the camera 154. The processing module 445 may comprise a processor 160, a volatile memory 172, and a non-volatile memory 174. In various embodiments, the non-volatile memory 174 may include a camera application 446 and/or a motion detection application 447. The camera application 446 and/or the motion detection application 447 may configure the processor 160 to perform processes for recording and/or streaming video footage from an A/V recording and communication device 430, as further described below. For example, such processes may include (but not be limited to) detecting motion of an object using the motion detection module 444 and/or the camera 154, capturing image data 448 using the camera 154, streaming the image data 448 to the client device 114 using the communication module 146, and stopping such functions as further described below. In some embodiments, the processor may be configured to use a timer 449 as further described below. In some embodiments, the motion detection module 444 may include at least one motion sensor, such as (but not limited to) the PIR sensor(s) 432 as described above. The motion detection module 444 may further comprise the camera 154, instead of or in addition to a discrete motion detecting device. Further, in some embodiments, the communication module 146 may comprise (but is not limited to) one or more transceivers and/or wireless antennas (not shown) configured to transmit and receive wireless signals.

With further reference to FIG. 28, image data 448 may comprise image sensor data such as (but not limited to) exposure values and data regarding pixel values for a particular size grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, image data may also be referred to as "video footage" and the term "recording" may also be referred to as "capturing" as appropriate to the requirements of a specific application in accordance with the present embodiments.

In addition, in the illustrated embodiment in FIG. 28, the processing module 445, the motion detection module 444, and the communication module 146 are represented by separate boxes. The graphical representation depicted in FIG. 28 is, however, merely one example, and is not intended to indicate that any of the processing module 445, the motion detection module 444, and/or the communication module 146 are necessarily physically separate from one another, although in some embodiments they might be. In other embodiments, however, the structure and/or functionality of any or all of these components may be combined. For example, either or both of the motion detection module 444 and the communication module 146 may include its own processor, volatile memory, and/or non-volatile memory.

Figure 29:
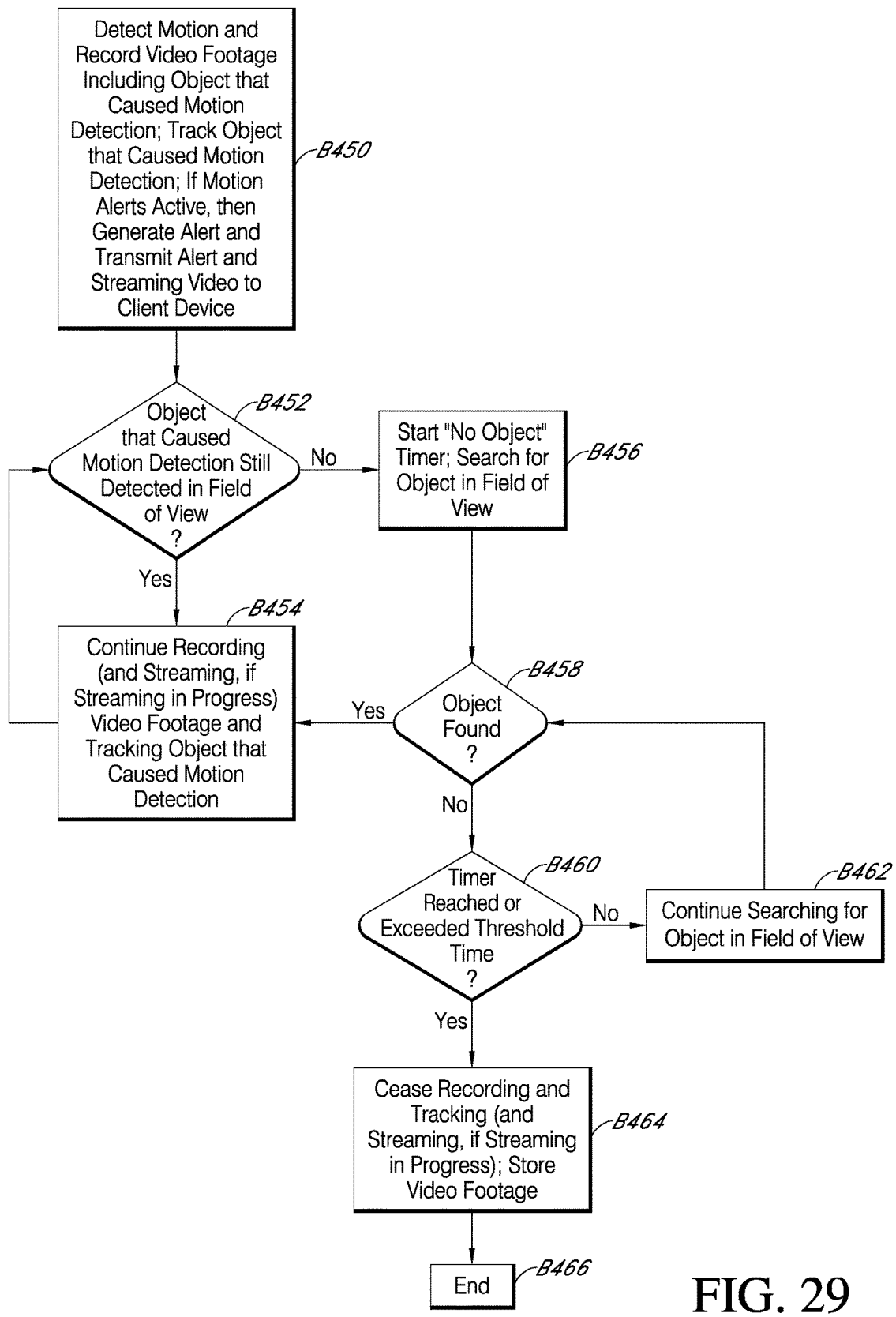
FIG. 29 is a flowchart illustrating a process for streaming video from an A/V recording and communication device according to various aspects of the present disclosure.

FIG. 29 is a flowchart illustrating a process for streaming video from an A/V recording and communication device, such as (but not limited to) the A/V recording and communication device 430, according to various aspects of the present disclosure. The process may include detecting (block B450) motion and recording (block B450) video footage, where the video footage includes the object that caused the motion detection as further described below. The process may also include tracking (block B450) the object that caused the motion detection as described above. Further, the process may include transmitting (block B450) the recorded video footage to the client device 114 using the communication module 146. In some embodiments, the transmission of the video footage to the client device 114 may be performed in a variety of methods including (but not limited to) by streaming the image data 448 to the client device 114, uploading the image data 448 to the server 118 for downloading by the client device 114, or any other suitable method as appropriate to the requirements of a specific application in accordance with the present embodiments. In addition, if the A/V recording and communication device 430 has been configured to provide motion alerts, then the process may also include generating (block B450) and transmitting (block B450) an alert to the client device 114 using the communication module 146. In some embodiments, the A/V recording and communication doorbell 430 may not begin recording and/or streaming video unless and until the object that caused the motion detection has been determined to be a human, for example, using one or more of the techniques described herein for determining whether a moving object is a human.

In further reference to FIG. 29, the process may also include determining (block B452) whether the object that caused the motion detection is still detected within the field of view using the camera 154 and/or the motion detection module 444. If the object is still detected in the field of view, then the process may continue (block B454) to record video footage, track the object, and stream video footage (if streaming is currently in progress). The process may continue to repeat blocks B452 and B454 until the object that caused the motion detection is no longer detected in the field of view. If and when the object that caused the motion detection is no longer detected in the field of view, then the process may include starting (block B456) a timer 449 and searching the field of view for the object. If the object is found (block B458), then the process may repeat blocks B454 and B452 until the object that caused the motion detection is no longer detected in the field of view. If the object is not found (block B458), then the process may determine (block B460) whether the timer 449 has expired by reaching and/or exceeding a predetermined threshold time. If the timer 449 has expired, then the A/V recording and communication device 430 may stop (block B464) recording video footage, tracking the object, and streaming video footage (if streaming is in progress), and the process may end (block B466). However, if the timer 449 has not expired, then the process may continue (block B462) to search for the object in the field of view until the object is found (block B458) or the timer 449 has reached or exceeded the predetermined threshold time (block B460). In some embodiments, if the object is found before the timer 449 has reached or exceeded the predetermined threshold time, the timer 449 may be stopped and/or restarted.

Figure 30:
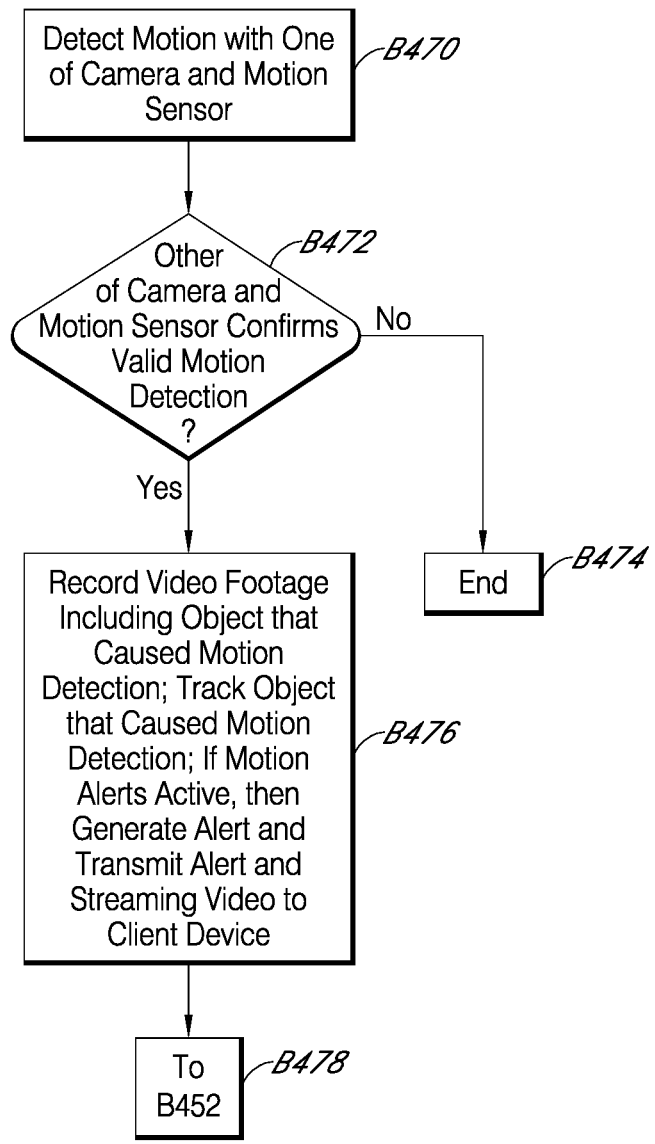
FIG. 30 is a flowchart illustrating a process for confirming motion detection by an A/V recording and communication device according to various aspects of the present disclosure.

FIG. 30 is a flowchart illustrating a process for confirming motion detection by an A/V recording and communication device 430 according to various aspects of the present disclosure. The process may include detecting (block B470) motion using either the camera 154 or a motion sensor such as (but not limited to) the PIR sensor 432 as described above. Upon detecting motion, the process may include confirming (Block B472) that the motion detection was valid using the other of the camera 154 or the motion sensor 432 that was not used to detect the motion in block B470. For example, if the camera 154 was used to detect the motion, then the motion sensor 432 may be used to confirm that the motion detection was valid. Likewise, if the motion sensor 432 was used to detect the motion, then the camera 154 may be used to confirm that the motion detection was valid. In further reference to FIG. 30, if the motion detection is not confirmed as valid, then the process may end (block B474). However, if it is confirmed that the motion detection was valid, then the process may include recording (block B476) video footage including the object that caused the motion detection and tracking (block B476) the object within the field of view as described above. Further, if it is confirmed that the motion detection was valid, the process may include streaming (block B476) video footage to a client device 114 using the communication module 146. In addition, if motion alerts settings have been configured as active, the process may include generating (block B476) and transmitting (block B476) an alert to the client device 114 using the communication module 146. Upon completion of block B476, the process may further include implementing (block B478) the processes in FIG. 29 by determining (block B452) whether the object that caused motion detection is still detected in the field of view.

Figure 31:
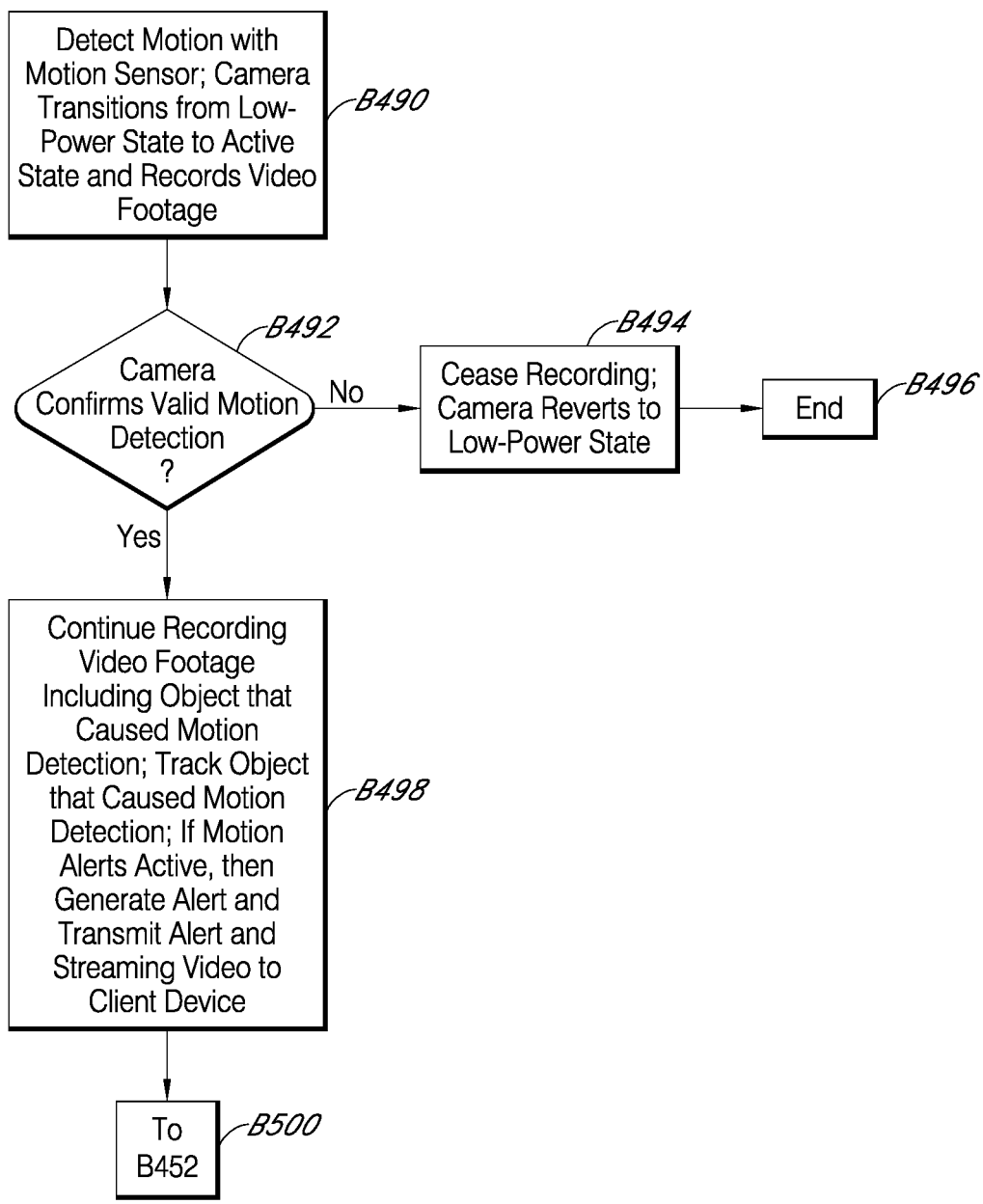
FIG. 31 is a flowchart illustrating another process for confirming motion detection by an A/V recording and communication device according to various aspects of the present disclosure.

In some embodiments, the camera 154 may transition from a low-power state to an active state to reduce power consumption by the A/V recording and communication device 430. FIG. 31 is a flowchart illustrating another process for confirming motion detection by an A/V recording and communication device 430 according to various aspects of the present disclosure. The process may include detecting (block B490) motion with a motion sensor 432 as described above. Upon motion detection, the camera 154 may be configured to transition (block B490) from a low-power state to an active state and record (block B490) video footage of its field of view. The process may then include confirming (block B492) that the motion detection was valid using the camera 154. If the motion detection is not confirmed as valid, then the process may cease (block B494) recording video footage and revert (block B494) the camera 154 back into the low-power state from the active state and the process may end (block B496). However, if the motion detection is confirmed, then the process may include continuing to record (block B498) video footage including the object that caused the motion detection and tracking (block B498) the object within the field of view as described above. Further, if it is confirmed that the motion detection was valid, the process may include streaming (block B498) video footage to a client device 114 using the communication module 146. In addition, if motion alerts settings have been configured as active, the process may include generating (block B498) and transmitting (block B498) an alert to the client device 114 using the communication module 146. Upon completion of block B498, the process may further include implementing (block 500) the processes in FIG. 29 by determining (block B452) whether the object that caused motion detection is still detected in the field of view.

The process illustrated in FIG. 31 is particularly advantageous for, but is not limited to, battery-operated A/V recording and communication devices. In such devices, it is desirable to limit the rate of power consumption so that the battery is not depleted rapidly, which would require frequent recharging and diminish the user experience. By setting the camera in a low-power state, battery consumption is reduced. The camera may then transition to an active state ("wakes up") in order to confirm a motion detection by the motion sensor and record and/or stream video is the motion detection is confirmed as valid.

FIG. 32 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 32, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 33:
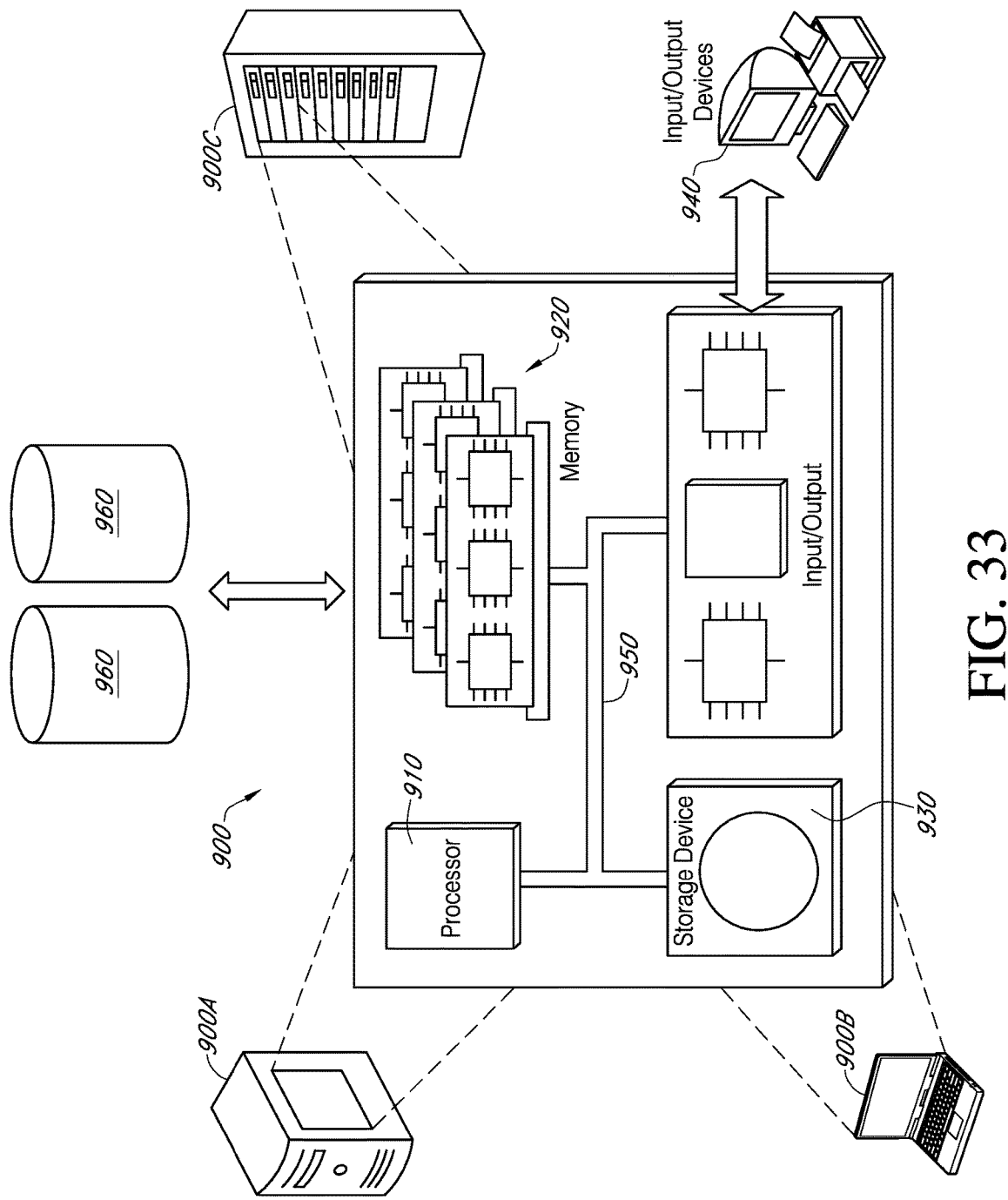
FIG. 33 is a functional block diagram of a general-purpose computing system on which the present embodiments may be implemented according to various aspects of present disclosure.

FIG. 33 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video (A/V) recording and communication device, comprising:
a camera configured to capture image data of an object within a field of view of the camera;
a communication module;
a processor operatively connected to the camera and to the communication module; and memory storing a motion detection application that, when executed by the processor, causes the processor to:
  detect motion of the object within the field of view of the camera;
  capture image data of the object using the camera;
  track the object within the field of view using the camera;
  stream the image data to a client device using the communication module;
  determine when the object is no longer detected within the field of view using the camera;
  start a timer upon determining that the object is no longer detected within the field of view;
  stop the timer upon determining that the object is detected before expiration of the timer, and restart the timer upon determining that the object is no longer detected within the field of view; and
  stop capturing the image data, tracking the object, and streaming the image data upon expiration of the timer.

2. The A/V recording and communication device of claim 1, wherein the motion detection application further configures the processor to generate an alert when the motion of the object within the field of view of the camera is detected, and to transmit the alert to the client device using the communication module.

3. The A/V recording and communication device of claim 1, further comprising a motion sensor configured to detect the motion of the object within the field of view of the camera.

4. The A/V recording and communication device of claim 3, wherein the motion detection application further configures the processor to detect the motion of the object within the field of view of the camera using the camera.

5. The A/V recording and communication device of claim 4, wherein the motion detection application further configures the processor to confirm, using the motion sensor, the detection, by the camera, of the motion of the object within the field of view of the camera.

6. The A/V recording and communication device of claim 5, wherein the motion detection application further configures the processor to not track the object, stream the image data, nor start the timer if the detection of the motion of the object within the field of view of the camera is not confirmed.

7. The A/V recording and communication device of claim 3, wherein the motion detection application further configures the processor to detect the motion of the object within the field of view of the camera using the motion sensor.

8. The A/V recording and communication device of claim 7, wherein the motion detection application further configures the processor to confirm, using the camera, the detection, by the motion sensor, of the motion of the object within the field of view of the camera.

9. The A/V recording and communication device of claim 8, wherein the motion detection application further configures the processor to not track the object, stream the image data, nor start the timer if the detection of the motion of the object within the field of view of the camera is not confirmed.

10. The A/V recording and communication device of claim 3, wherein the motion detection application further configures the processor to set the camera into a low-power state.

11. The A/V recording and communication device of claim 10, wherein the motion detection application further configures the processor to transition the camera from the low-power state to an active state upon the detection of the motion of the object within the field of view of the camera using the motion sensor.

12. The A/V recording and communication device of claim 11, wherein the motion detection application further configures the processor to confirm, using the camera, the detection, by the motion sensor, of the motion of the object within the field of view of the camera.

13. The A/V recording and communication device of claim 12, wherein the motion detection application further configures the processor to transition the camera from the active state to the low-power state if the detection of the motion of the object within the field of view of the camera is not confirmed.

14. The A/V recording and communication device of claim 3, wherein the motion sensor comprises one or more passive infrared (PIR) sensors.

15. The A/V recording and communication device of claim 14, wherein the one or more PIR sensors detects changes in an amount of infrared (IR) radiation emitting from the object.

16. The A/V recording and communication device of claim 15, wherein the amount of IR radiation emitting from the object varies depending on temperature and/or surface characteristics of the object.

17. The A/V recording and communication device of claim 14, wherein the one or more of the PIR sensors comprise a pyroelectric infrared sensor.

* * * * *